United States Patent
Fersch et al.

(10) Patent No.: US 11,967,330 B2
(45) Date of Patent: Apr. 23, 2024

(54) METHODS AND DEVICES FOR GENERATION AND PROCESSING OF MODIFIED AUDIO BITSTREAMS

(71) Applicants: DOLBY INTERNATIONAL AB, Amsterdam Zuidoost (NL); DOLBY LABORATORIES LICENSING CORPORATION, San Francisco, CA (US)

(72) Inventors: Christof Fersch, Neumarkt (DE); Daniel Fischer, Fuerth (DE); Leon Terentiv, Erlangen (DE); Gregory John McGarry, Surry Hills (AU)

(73) Assignees: DOLBY INTERNATIONAL AB, Dublin (IE); DOLBY LABORATORIES LICENSING CORPORATION, San Francisco, CA (US)

(*) Notice: Subject to any disclaimer, the term of this patent is extended or adjusted under 35 U.S.C. 154(b) by 0 days.

(21) Appl. No.: 17/635,183

(22) PCT Filed: Aug. 13, 2020

(86) PCT No.: PCT/US2020/046042
§ 371 (c)(1),
(2) Date: Feb. 14, 2022

(87) PCT Pub. No.: WO2021/030515
PCT Pub. Date: Feb. 18, 2021

(65) Prior Publication Data
US 2022/0277755 A1    Sep. 1, 2022

Related U.S. Application Data
(60) Provisional application No. 62/887,098, filed on Aug. 15, 2019.

(30) Foreign Application Priority Data
Aug. 15, 2019    (EP) .................................... 19191920

(51) Int. Cl.
*G10L 19/083*    (2013.01)
*G10L 19/16*     (2013.01)

(52) U.S. Cl.
CPC .......... *G10L 19/083* (2013.01); *G10L 19/167* (2013.01)

(58) Field of Classification Search
CPC ........................... G10L 19/083; G10L 19/167
See application file for complete search history.

(56) References Cited

U.S. PATENT DOCUMENTS 7,039,116 B1    5/2006    Zhang
7,936,785 B2    5/2011    Ehret
(Continued)

FOREIGN PATENT DOCUMENTS

EP    1189445 A2    3/2002
EP    1635575 A1    3/2006
(Continued)

OTHER PUBLICATIONS

Komori, T. Trends in Standardization of Audio Coding Technologies, NHK, STRL Broadcast Technology, No. 64, Spring 2016.
(Continued)

*Primary Examiner* — Brian L Albertalli

(57) ABSTRACT

Described herein is a method for generating a modified bitstream on a source device, wherein the method includes the steps of: a) receiving, by a receiver, a bitstream including coded media data; b) generating, by an embedder, payload of additional media data and embedding the payload in the bitstream for obtaining, as an output from the embedder, a modified bitstream including the coded media data and the payload of the additional media data; and c) outputting the
(Continued)

modified bitstream to a sink device. Described is further a method for processing said modified bitstream on a sink device. Described are moreover a respective source device and sink device as well as a system of a source device and a sink device and respective computer program products.

21 Claims, 13 Drawing Sheets

(56) References Cited

U.S. PATENT DOCUMENTS

| | | | |
|---|---|---|---|
| 8,108,220 | B2 | 1/2012 | Saunders |
| 8,756,626 | B2 | 6/2014 | Strasser |
| 8,918,343 | B2 | 12/2014 | Mitchell |
| 9,779,736 | B2 | 10/2017 | Lowe |
| 9,805,400 | B2 | 10/2017 | Duggan |
| 9,854,019 | B2 | 12/2017 | Herrfurt |
| 9,854,279 | B2 | 12/2017 | Petrov |
| 9,947,326 | B2 | 4/2018 | Ghido |
| 10,008,214 | B2 | 6/2018 | Beack |
| 10,075,802 | B1 | 9/2018 | Kim |
| 10,276,173 | B2 | 4/2019 | Baumgarte |
| 2002/0181606 | A1 | 12/2002 | De Bont |
| 2004/0160962 | A1 | 8/2004 | Johnston |
| 2007/0294738 | A1 | 12/2007 | Kuo |
| 2009/0055005 | A1 | 2/2009 | Oxman |
| 2011/0213681 | A1 | 9/2011 | Shahid |
| 2013/0298171 | A1 | 11/2013 | Takeda |
| 2014/0297291 | A1 | 10/2014 | Baumgarte |
| 2016/0196830 | A1 | 7/2016 | Riedmiller |
| 2018/0068666 | A1 | 3/2018 | Riedmiller |
| 2019/0132371 | A1 | 5/2019 | Bhat |
| 2020/0395027 | A1 | 12/2020 | Schreiner |
| 2021/0335376 | A1* | 10/2021 | Fersch .................. G10L 19/167 |

FOREIGN PATENT DOCUMENTS

| | | |
|---|---|---|
| EP | 2360683 B1 | 4/2014 |
| EP | 2843963 A1 | 3/2015 |
| EP | 3470976 A1 | 4/2019 |
| EP | 3145189 B1 | 6/2019 |
| EP | 3244406 B1 | 12/2020 |
| EP | 3522554 B1 | 12/2020 |
| KR | 100545901 B1 | 2/2006 |
| KR | 100916702 B1 | 9/2009 |
| KR | 101519000 B1 | 5/2015 |
| WO | 2000016558 A1 | 3/2000 |
| WO | 2010003152 W | 1/2010 |
| WO | 2016060101 A1 | 4/2016 |
| WO | 2016172328 A1 | 10/2016 |
| WO | 2019072890 A1 | 4/2019 |

OTHER PUBLICATIONS

Ali, M.T. et al "Improved Audio Quality at 48 Kbits/s for MPEG-4 AAC" Second International Conference on Electrical Engineering, Mar. 25-26, 2008, IEEE, pp. 1-8.
Bluetooth SIG, Addition of New AAC Object Types to A2DP—Update to Bluetooth FRD, 2012.
EBU-Tech 3324 EBU Evaluations of Multichannel Audio Codecs Sep. 2007.
ISO/IEC "Information Technology—High Efficiency Coding and Media Delivery in Heterogenous Environments" 23008-3:2019.
Yamamoto, Y. et al "A New Bandwidth Extension Technology for MPEG Unified Speech and Audio Coding" IEEE, Dec. 2013, pp. 523-527.

* cited by examiner

METHODS AND DEVICES FOR GENERATION AND PROCESSING OF MODIFIED AUDIO BITSTREAMS

CROSS REFERENCE TO RELATED APPLICATIONS

This application claims priority to United States Provisional Patent Application No. 62/887,098, filed Aug. 15, 2019 and European Patent Application No. 19191920.8, filed Aug. 15, 2019, each of which is hereby incorporated by reference in its entirety.

TECHNOLOGY

The present disclosure relates generally to a method and source device for generating a modified bitstream, and more specifically to generating a modified bitstream by embedding payload of additional media data into a bitstream including coded media data. The present disclosure also relates to a method and sink device for processing said modified bitstream.

While some embodiments will be described herein with particular reference to that disclosure, it will be appreciated that the present disclosure is not limited to such a field of use and is applicable in broader contexts.

BACKGROUND

Any discussion of the background art throughout the disclosure should in no way be considered as an admission that such art is widely known or forms part of common general knowledge in the field.

Recent efforts have been made to establish AAC-family based codecs as part of the Bluetooth (BT) Ecosystem. In this context, the Bluetooth SIG may define use-cases which require to pass-through bitstreams received on, for example, a mobile device (BT source) to connected speaker systems (BT sink). As the data-format used from the service throughout the BT endpoint may be coded audio, there is no easy way of conveying earcons and/or system sounds from the mobile device to the BT speaker. Such earcons may include ringtones, mail notification sounds, key-press sounds and so on.

In currently deployed systems, the audio received from a service is usually decoded in the device into the uncompressed domain (PCM), where it can be modified and/or mixed. If a pass-through mode of operation is enabled, there may be no easy possibility on the BT-source device in order to enable and/or mix system sounds into the experience which is transported from BT source to BT sink.

One possibility to overcome this limitation by still enabling pass-through, would be to open an additional link between both devices. However, this setup has the drawback that it needs an additional link and encoder-decoder pair of a Bluetooth-codec in order to work. This comes with unwanted additional system complexity and burdens both the BT source and sink device with additional computational complexity, which may cost battery as well.

Accordingly, there is an existing need for simultaneous generating and processing of earcons and/or system sounds in parallel to the media content via bitstreams, in particular in MPEG-4 audio format.

SUMMARY

In accordance with a first aspect of the present disclosure there is provided a method for generating a modified bitstream by a source device. The source device may comprise a receiver, and an embedder. The method may include the step of a) receiving, by the receiver, a bitstream including coded media data. The method may further include the step of b) generating, by the embedder, payload of additional media data and embedding the payload in the bitstream, for obtaining, as an output from the embedder, a modified bitstream including the coded media data and the payload of the additional media data. And the method may include the step of c) outputting the modified bitstream to a sink device.

Configured as proposed, the method allows to insert system sounds or Earcons into a bitstream that includes coded media data and that is passed through by a source device (e.g., a Bluetooth source device, such as a mobile phone) for a sink device (e.g., a Bluetooth sink device, such as a Bluetooth loudspeaker). This enables to pass system sounds/Earcons to the sink device without having to establish an additional connection between the source device and the sink device, and without having to decode and re-encode the coded media data. Moreover, the method enables simultaneous processing of the system sounds/Earcons and the coded media data.

In some embodiments, the additional media data may be played back by the sink device.

In some embodiments, the additional media data may be played back by the source device.

In some embodiments, the coded media data in the received bitstream may be passed through the source device to the sink device via the modified bitstream.

In some embodiments, step b) may further include generating information on the additional media data and embedding the information in the bitstream.

In some embodiments, the generated information may include one or more of information on a configuration of the additional media data, information on a presence of the additional media data in the modified bitstream, information on a default loudness value, information on a value for delay alignment, information on delay adaption, information on panning and information on a type of the additional media data.

In some embodiments, step b) may further include generating information relating to a relative gain between the coded media data and the additional media data and embedding the information relating to the relative gain in the bitstream.

In some embodiments, the modified bitstream may be in MPEG-4 audio format. Accordingly, system sounds/Earcons can be transmitted to the sink device as part of the coded bitstream when the source device is in pass-through mode for media data that is coded in MPEG-4 audio format, without need to decode and re-encode the media data.

In some embodiments, the generated payload may be embedded in the bitstream by transporting the payload in the (modified) bitstream via an MPEG-4 audio bitstream extension mechanism.

In some embodiments, further the generated information and/or the generated information relating to the relative gain may be embedded in the bitstream by transporting the generated information relating to the relative gain in the (modified) bitstream via the MPEG-4 audio bitstream extension mechanism.

In some embodiments, the MPEG-4 audio bitstream extension mechanism may be a data stream element (DSE).

In some embodiments, the data stream element may be located at a predefined position in the modified bitstream and/or may include a specific instance tag.

In some embodiments, the MPEG-4 audio bitstream extension mechanism may be a Fill Element (ID_FIL).

In some embodiments, the generated payload may be transported via a generic extension payload element inside the Fill Element.

In some embodiments, further the generated information and/or the generated information relating to the relative gain may be transported via the generic extension payload element inside the Fill Element.

In some embodiments, the generated payload may be transported via a new extension payload element inside the Fill Element.

In some embodiments, further the generated information and/or the generated information relating to the relative gain may be transported via the new extension payload element inside the Fill Element.

In some embodiments, the new extension payload element may include a unique identifier.

In some embodiments, in step c) the modified bitstream may be output to the sink device via a Bluetooth connection.

In some embodiments, the additional media data may be compressed media data or uncompressed media data.

In some embodiments, the uncompressed media data may be PCM data generated at the source device.

In some embodiments, the generation of the PCM data may be based on a user input.

In some embodiments, the PCM data may include one or more of earcon-data and system sounds data.

In some embodiments, the compressed data may be in SBC format or in an aptX-based format.

In accordance with a second aspect of the present disclosure there is provided a method for processing a modified bitstream by a sink device. The sink device may comprise a receiver, a bitstream parser, a core decoder and a mixer. The method may include the step of a) receiving, by the receiver, a modified bitstream including coded media data and payload of additional media data. The method may further include the step of b) parsing, by the bitstream parser, the modified bitstream into the coded media data and the payload of additional media data. The method may further include the step of c) core decoding, by the core decoder, the coded media data to obtain core decoded media data. The method may further include the step of d) mixing, by the mixer, the core decoded media data and the additional media data to obtain an output signal. And the method may include the step of e) outputting the output signal.

In some embodiments, the modified bitstream may further include information on the additional media data, and the method may further include, after step a) and before step b), a step of processing the modified bitstream may be based on the information.

In some embodiments, the information may include one or more of information on a configuration of the additional media data, information on a presence of the additional media data in the modified bitstream, information on a default loudness value, information on a value for delay alignment, information on delay adaption, information on panning and information on a type of the additional media data.

In some embodiments, the modified bitstream may further include information relating to a relative gain between the coded media data and the additional media data, and mixing in step d) the core decoded media data and the additional media data may be based on the information relating to the relative gain.

In some embodiments, the method may further include the step of processing, by a processing unit, the additional media data prior to mixing the core decoded media data and the additional media data.

In some embodiments, processing the additional media data may include one or more of resampling, delay adaption and loudness processing.

In some embodiments, the additional media data may be compressed media data and the method may further include the step of decoding, by a decoder, the compressed media data to obtain decoded additional media data, and in step d) the decoded additional media data may be mixed with the core decoded media data.

In some embodiments, the compressed media data may be in SBC format or in an aptX-based format.

In some embodiments, the additional media data may be uncompressed media data, and in step d) the uncompressed additional media data may be mixed with the core decoded media data.

In some embodiments, the modified bitstream may be in MPEG-4 audio format.

In some embodiments, the modified bitstream may include an MPEG-4 audio bitstream extension mechanism, and parsing in step b) may further be based on identifying the MPEG-4 audio bitstream extension mechanism in the modified bitstream.

In some embodiments, the MPEG-4 audio bitstream extension mechanism may be a data stream element (DSE) and parsing in step b) may further be based on identifying a position of the data stream element in the modified bitstream and/or identifying a specific instance tag of the data stream element.

In some embodiments, the MPEG-4 audio bitstream extension mechanism may be a Fill Element (ID_FIL) and parsing in step b) may further be based on identifying an extension payload element inside the Fill Element.

In accordance with a third aspect of the present disclosure there is provided a source device for generating a modified bitstream. The device may include a) a receiver configured to receive a bitstream including coded media data. The device may further include b) an embedder configured to generate payload of additional media data and to embed the generated payload in the bitstream to obtain a modified bitstream including the coded media data and the payload of the additional media data. And the device may include c) a control unit configured to output the modified bitstream to a sink device.

In some embodiments, the embedder may further be configured to generate information on the additional media data and to embed the information in the bitstream.

In some embodiments, the embedder may further be configured to generate information relating to a relative gain between the coded media data and the additional media data and to embed the information relating to the relative gain in the bitstream.

In some embodiments, the modified bitstream may be in MPEG-4 audio format.

In some embodiments, the additional media data may be compressed media data or uncompressed media data.

In some embodiments, the uncompressed media data may be PCM data generated at the source device.

In some embodiments, the generation of the PCM data may be based on a user input.

In some embodiments, the PCM data may include one or more of earcon-data and system sounds data.

In some embodiments, the compressed media data may be in SBC format or in an aptX-based format.

In accordance with a fourth aspect of the present disclosure there is provided a sink device for processing a modified bitstream. The device may include a) a receiver configured to receive a modified bitstream including coded media data and payload of additional media data. The device may further include b) a bitstream parser configured to parse the modified bitstream into the coded media data and the payload of the additional media data. The device may further include c) a core decoder configured to core decode the coded media data to obtain core decoded media data. The device may further include d) a mixer configured to mix the core decoded media data and the additional media data to obtain an output signal. And the device may include e) a control unit configured to output the output signal.

In some embodiments, the device may further include a processing unit configured to process the additional media data prior to mixing the core decoded media data and the additional media data.

In some embodiments, the additional media data may be uncompressed media data, and the mixer may be configured to mix the core decoded media data and the uncompressed additional media data.

In some embodiments, the additional media data may be compressed media data and the device may further include a decoder to decode the compressed media data to obtain decoded additional media data, and the mixer may be configured to mix the core decoded media data and the decoded additional media data.

In some embodiments, the modified bitstream may further include information on the additional media data, and the sink device may be configured to process the modified bitstream based on the information.

In some embodiments, the modified bitstream may further include information relating to a relative gain between the coded media data and the additional media data, and the mixer may further be configured to mix the core decoded media data and the additional media data based on the information relating to the relative gain.

In some embodiments, the core decoder may be an MPEG-4 audio decoder.

In accordance with a fifth aspect of the present disclosure there is provided a system of a source device for generating a modified bitstream, wherein the source device includes one or more processors configured to perform a method for generating a modified bitstream on said source device and a sink device for processing a modified bitstream, wherein the sink device includes one or more processors configured to perform a method for processing a modified bitstream on said sink device.

In accordance with a sixth aspect of the present disclosure there is provided a computer program product comprising a computer-readable storage medium with instructions adapted to cause the device to carry out a method for generating a modified bitstream on a source device when executed by a device having processing capability.

In accordance with a seventh aspect of the present disclosure there is provided a computer program product comprising a computer-readable storage medium with instructions adapted to cause the device to carry out a method for processing a modified bitstream on a sink device when executed by a device having processing capability.

BRIEF DESCRIPTION OF THE DRAWINGS

Example embodiments of the disclosure will now be described, by way of example only, with reference to the accompanying drawings in which.

DESCRIPTION OF EXAMPLE EMBODIMENTS

Generation and Processing of MPEG-4 Audio Modified Bitstreams

In the following, methods and devices will be described for generation and processing of modified MPEG-4 audio bitstreams. Within this document, MPEG-4 audio bitstreams may refer to bitstreams compatible with the standard set out in ISO/IEC 14496-3, Coding of audio-visual objects—Part 3: Audio, and all future editions, revisions and amendments thereto ("hereinafter MPEG-4 audio"). By the described methods and devices, additional media data, being uncompressed or compressed media data, may be transported and processed together with coded media data delivering media content. This may enable to transmit and process earcon and/or system sounds data without the additional burden of system- and computational complexity in both, source and sink device.

Additionally, it may be possible to control all settings (e.g. level of system sounds, DRC etc.) on both the source device and the sink device using a same mechanism and bitstream variables. This means, a relative gain (or mixing gain) used by an embedder of the source device may be exactly the same as a control parameter used by a mixer of the sink device.

Generating a Modified Bitstream on a Source Device

Figure 1:
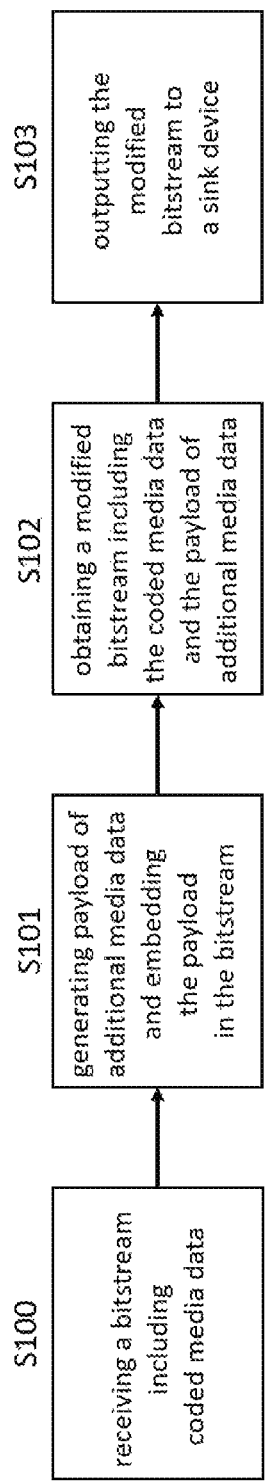
FIG. 1 illustrates a flow diagram of an example of a method for generating a modified bitstream on a source device.

Referring to the example of FIG. 1, an example of a method for generating a modified bitstream on a source device is illustrated. In step S100 a bitstream including coded media data (to be core decoded by a sink device as detailed below) may be received by a receiver of the source device. The bitstream including the coded media data may be received, for example, from one or more media servers. The coded media data may include coded audio data. The coded audio data may be compliant with the MPEG-4 audio standard. The bitstream may, for example, deliver audio content to be played back by a sink device connected to the source device. The source device is not limited. For example, the source device may be a mobile device, including one or more of a mobile phone, a smart watch, a laptop and a tablet pc including convertibles. Referring again to the example of FIG. 1, in step S101, payload of additional media data (i.e. other than and in addition to the coded media data, e.g. additional audio data) may be generated and embedded in the bitstream by an embedder.

The additional media data generated in step S101 is to be mixed with the media data by (at a side of) the sink device. Advantageously, this enables mixing of the additional media data with the media data at the sink device side.

The coded media data and the additional media data are different (e.g. type of) media data. For example, as explained below, the coded media data and the additional media data may have different format. The coded media data and the additional media data include different type of media content. The coded media data may include main audio content, e.g., music, audio, etc. The additional media data may include secondary audio content, e.g., earcons, system sounds, key press sounds, e-mail notification sounds, etc. The main audio content and the secondary audio content may be played back by the sink device.

Alternatively or additionally, the main audio content and the secondary audio content may be played back by the source device.

In an embodiment, the coded media data may be played back by the source device, the sink device or both the source device and the sink device.

In an embodiment, the additional media data may be played back by the source device, the sink device or both the source device and the sink device.

In an embodiment, the additional media data may be compressed media data (to be decoded by a sink device as detailed below to obtain decoded additional media data) or uncompressed media data. While the uncompressed media data is not limited, in an embodiment, the uncompressed media data may be PCM data generated at the source device. While the generation of PCM data is also not limited, in an embodiment, the generation of the PCM data may be based on a user input. The user input may be, for example, a key-press.

Alternatively, or additionally, the generation of the PCM data may be facilitated at the source device independent of a user input, e.g. based on an email notification. In an embodiment, the PCM data may include one or more of earcon-data and system sounds data. Also, while the format of the compressed media data is not limited, the format may belong to the Bluetooth ecosystem. In an embodiment, the compressed media data may be in SBC format or in an aptX-based format.

Referring again to the example of FIG. 1, in step S102, as an output from the embedder, a modified bitstream including the coded media data and the payload of additional media data may be obtained. In step S103 the modified bitstream may then be output to a sink device.

The coded media data in the received bitstream is passed through the source device to the sink device via the modified bitstream. The coded media data as received from the source device is embedded in the modified bitstream and outputted to the sink device.

Advantageously, generating (at the source device) and outputting the modified bitstream to the sink device streamlines mixing of the media data with the additional media data at the side of the sink device. A single bitstream is used by the source device to embed and transport the media data and the additional media data to the sink device, thereby a single channel/connection can be used between the source and the sink device. Furthermore, no additional decoders and/or encoders are present in the source device to, e.g., decode and re-encode the coded media data. No additional mixers are used in the source device to, e.g., mix decoded coded media data with the additional media data.

In an embodiment, the modified bitstream may be output to the sink device via a Bluetooth connection. In other words, the source device may be connected to a sink device via a Bluetooth connection. For example, earphones connected to a mobile phone via Bluetooth.

In general, the proposed technique and implementations and examples thereof described throughout this disclosure involve generating and outputting a modified bitstream to the sink device facilitates transmission of the payload of additional media data (e.g., system sounds/Earcons) to the sink device, e.g. when the source device is in a pass-through mode of operation. In other words, the payload of additional media data may be generated and embedded into the received bitstream including the coded media data to generate the modified bitstream without, for example, decoding and re-encoding the coded media data. Likewise, the additional media data can be passed to the sink device without need to establish an additional connection between the source device and the since device. As a further advantage, the proposed technique enables simultaneous processing of the additional media data and the coded media data.

Figure 2:
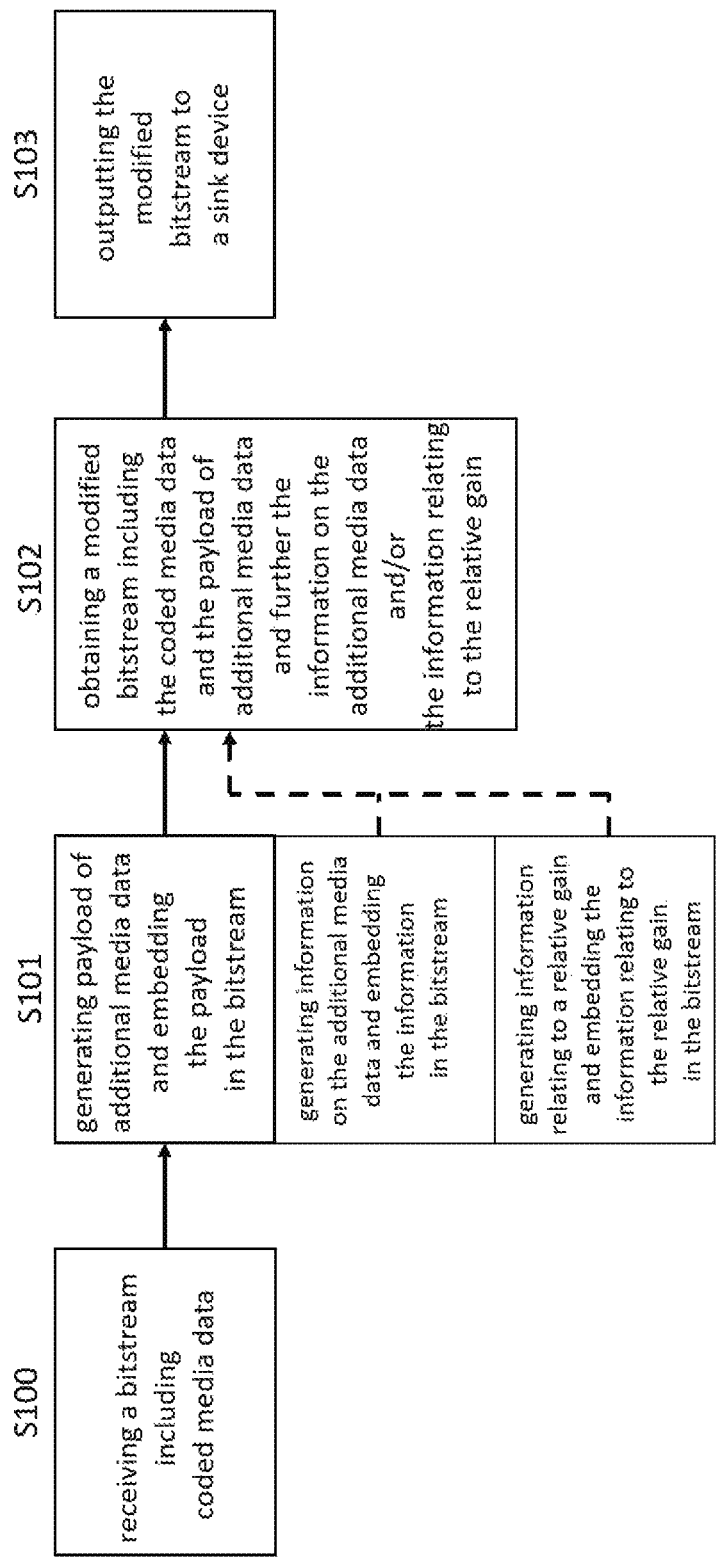
FIG. 2 illustrates a flow diagram of a further example of a method for generating a modified bitstream on a source device.

Referring now to the example of FIG. 2, a further example of a method for generating a modified bitstream on a source device is illustrated. The example of FIG. 2 differs from the example of FIG. 1 detailed above in that in step S101 further information on the additional media data may be generated (e.g. as part of metadata) and embedded in the bitstream (as indicated by the dashed line). In an embodiment, the generated information may include one or more of information on a configuration of the additional media data, information on a presence of the additional media data in the modified bitstream, information on a default loudness value, information on a value for delay alignment, information on delay adaption, information on panning and information on a type of the additional media data. The generated information may be utilized by the sink device to process the received modified bitstream as detailed below. The information on the configuration of the additional media data may, for example, include information on a sampling rate which may enable to decide at the side of the sink device as to whether the additional media data may need to be resampled prior to mixing. Alternatively, or additionally, the information on the configuration of the additional media data may further include, for example, information on a channel mode which may enable to decide at the side of the sink device if the additional media data may need to be downmixed/upmixed prior to mixing. The information on a default loudness value may include, for example, a measured loudness as according to one of the methods specified in ITU-R BS.1770-4. The measured loudness may enable to decide at the side of the sink device at which level the additional media data may be mixed with the core decoded media data. Further, the information on the type of the additional media data may indicate at the side of the sink device as to whether the additional media data may need to be decoded, for example, as to whether the additional media data may be uncompressed or compressed media data.

Alternatively, or additionally, step S101 may further include generating information relating to a relative gain between the coded media data and the additional media data (e.g. also as part of metadata) and embedding the information relating to the relative gain in the bitstream (as indicated by the dashed line). The relative gain between the coded media data and the additional media data may be used by the sink device to generate an output signal based on the received modified bitstream as detailed below. In this, source device and sink device may use the same relative gain value. For example, if the source device is a mobile phone, optimal system sound mixing settings may be automatically determined based on an estimated loudness ratio of the system sounds and coded media data content. For example, the relative gain value may include a mixing gain value and/or an attenuation gain value which may be used by the mixer of the sink device. By including this information into the bitstream, it can be ensured that the additional media data can be mixed with the coded media data, after decoding, in an appropriate manner, and cases in which the additional media data is rendered at an inappropriate sound level compared to the coded media data can be avoided. In general, by including the information on the additional media data into the bitstream, the source device is given control over the processing (e.g., including rendering) of the additional media data at the sink device. This ensures appropriate rendering of the additional media data at the sink device.

While the format of the modified bitstream is not limited, in an embodiment, the modified bitstream may be in MPEG-4 audio format (i.e. MPEG-4 audio standard compliant bitstream). Referring to the example of FIG. 1, in an embodiment, the generated payload may be transported in the modified bitstream via an MPEG-4 audio bitstream extension mechanism. Referring to the example of FIG. 2, additionally, in an embodiment, further the generated information and/or the generated information relating to the relative gain may be transported in the modified bitstream via the MPEG-4 audio bitstream extension mechanism.

As an example, the following syntax may be used in order to embed the generated payload of the additional media data, the generated information on the additional media data and/or the generated information relating to the relative gain into the modified bitstream of MPEG-4 audio format.

Syntax of system_sound_info( )

Top level syntactic element to convey the generated payload of the additional media data, the generated information (information on the additional media data) and/or the generated information relating to the relative gain.

```
system_sound_info( ) {
    // Configuration
    system_sound_config_present;              1   bslbf
    if(system_sound_config_present) {
        static config = system_sound_config( )
    }
    // Payload
    system_sound_payload_present;             1   bslbf
    if(system_sound_payload_present) {
        system_sound_payload(config)
    }
}
```

Semantics of system_sound_info( )

| Element | Description |
|---|---|
| system_sound_config_present | If set, system_sound_config is present in the stream |
| system_sound_payload_present | If set, system_sound_payload is present in the stream |

Syntax of system_sound_config( )

```
system_sound_config( ) {
    num_sys_sounds;                               8   uimsbf
    for(s = 0; s <= num_sys_sounds; ++s) {
        sys_sound_id[s];                          8   bslbf
        sys_sound_type[s];                        4   bslbf
        reserved;                                 1   bslbf
        sys_sound_panning[s];                     8   uimsbf
        sys_sound_gain_present;                   1   bslbf
        if(sys_sound_gain_present) {
            sys_sound_gain[s];                    8   uimsbf
        }
        sys_sound_loudness_present;               1   bslbf
        if(sys_sound_loudness_present) {
            sys_sound_loudness[s];                8   uimsbf
        }
        sys_sound_attenuation_gain_present;       1   bslbf
        if(sys_sound_attenuation_gain_present) {
            sys_sound_attenuation_gain[s];        8   uimsbf
        }
        switch(sys_sound_type[s]) {
        case SYS_PCM:
            pcm_data_config( );
            break;
        case SYS_SBC:
            sbc_data_config( ); // Placeholder: Not defined here
            break;
        case SYS_APTX:
            aptx_data_config( ); // Placeholder: Not defined here
            break;
        default:
            // Not supported
            break;
        }
    }
}
```

Semantics of system_sound_config( )

TABLE 1

| Semantics of system_sound_config( ) | |
|---|---|
| Element | Description |
| num_sys_sound | The number of system sounds embedded in the stream minus 1 |
| sys_sound_id | Unique identifier for each system sound in the stream |
| | System sound encoding type according to: |
| sys_sound_type | sys_sound_type        Encoding |
| | 0    SYS_PCM    PCM<br>1    SYS_SBC    SBC<br>2    SYS_APTX    AptX<br>3 . . . 15    reserved |
| sys_sound_panning | Panning of the system sound: (sys_sound_panning * 360)/($2^8$-1), 0° front center, positive values to the left |
| sys_sound_gain_present | If set, a gain value is available for the corresponding system sound ID |
| sys_sound_gain | Absolute gain value for system sound audio signal (default: 0 dB) |
| sys_sound_loudness_present | If set, a loudness value is available for the corresponding system sound ID |
| sys_sound_loudness | Loudness value for the system sound audio signal |
| sys_sound_attenuation_gain_present | If set, an attenuation gain value is available for the corresponding system sound ID |
| sys_sound_attenuation_gain | Attenuation gain ("ducking") to be applied on the main audio program, default 0 dB |

Syntax of system_sound_payload( )

```
system_sound_payload(config) {
    // config of type system_sound_config
    for(s = 0; s <= config.num_sys_sounds; ++s) {
        if(!sys_sound_active) {                              1 bslbf
            continue;
        }
        switch(config.sys_sound_type[s]) {
        case SYS_PCM:
            pcm_data_payload( );
            break;
        case SYS_SBC:
            sbc_data_payload( ); // Placeholder: Not defined here
            break;
        case SYS_APTX:
            aptx_data_payload( ); // Placeholder: Not defined here
            break;
        default:
            break;
        }
    }
}
```

Semantics of system_sound_payload( )

| Element | Description |
|---|---|
| sys_sound_active | System sound is active and shall be decoded |

Syntax of pcm_data_config( )

```
pcm_data_config( ) {
    pcm_num_channels;                                         8
    uimsbf
    pcm_endianness;                                           1
    bslbf
    pcm_align_audio;                                          1
    bslbf
    reserved;                                                 1
    bslbf
    pcm_sample_rate_index;                                    5
    bslbf
    if(0x1f == pcm_sample_rate_index) {
        pcm_sample_rate;                                      24
    uimsbf
    }
    pcm_frame_size_index;                                     3
    bslbf
    reserved;                                                 1
    bslbf
    if(0x06 == pcm_frame_size_index) {
        pcm_frame_size;                                       16
    uimsbf
    }
    pcm_data_format_index;                                    4
    bslbf
}
```

Semantics of pcm_data_config( )

TABLE 2

Semantics of pcm_data_config( )

| Element | Description |
| --- | --- |
| pcm_num_channels | Number of PCM channels |
| pcm_endianness | 0: big endian, 1: little endian |
| pcm_align_audio | If set, PCM data should be delay aligned with the main audio program before mixing, controls delay adaption. |
| pcm_sample_rate_index | Sampling rate index as defined in ISO/IEC 14496-3 and ISO/IEC 23003-3, resp. |
| pcm_sample_rate | PCM sampling rate |
| pcm_frame_size_index | Index into frame size table below: |

| pcm_frame_size_index | Number of samples per frame |
| --- | --- |
| 0 × 00 | outputFrameLength as defined in ISO/IEC 23003-3 |
| 0 × 01 | 768 |
| 0 × 02 | 960 |
| 0 × 03 | 1024 |
| 0 × 04 | 2048 |
| 0 × 05 | 4096 |
| 0 × 06 | Frame size signaled in pcm_data_config |
| 0 × 07 | reserved |

| | |
| --- | --- |
| pcm_frame_size | Frame size in samples per channel |
| pcm_data_format_index | Index into format table below (i: integer, f: floating point) |

| Index | Encoding | Bits per Sample (bps) |
| --- | --- | --- |
| 0 | LPCM_16i | 16 |
| 1 | LPCM_24i | 24 |
| 2 | LPCM_32i | 32 |
| 3 | LPCM_32f | 32 |
| 4 | LPCM_64f | 64 |
| 5 | mu-law | 8 |
| 6 | A-law | 8 |
| 7 . . . 15 | reserved | |

Syntax of pcm_data_payload( )

```
pcm_data_payload( ) {
    for(i = 0; i < pcm_frame_size; ++i) {
    (NOTE 1)
        for(ch = 0; ch < pcm_num_channels) {
            pcm_sample;                              bps
            bslbf (NOTE 2)
        }
    }
}
```

NOTE 1:
`pcm_frame_size` is either derived from `pcm_frame_size_index` or set directly in `pcm_data_config`
NOTE 2:
Bits per sample (bps) can be derived from `pcm_data_format_index`

Semantics of pcm_data_payload( )

TABLE 3

Semantics of pcm_data_payload( )

| Element | Description |
| --- | --- |
| pcm_sample | PCM sample, either IEEE 754 (floating point) or two's complement |

There are at least two independent extension mechanisms provided by the MPEG-4 audio standard. Either a data stream element (ID_DSE) or extension_payload(int) may be used to transport the generated payload of additional media data, the generated information and/or the generated information relating to the relative gain. In an embodiment, the MPEG-4 audio bitstream extension mechanism may be a data stream element (DSE). Data stream elements in MPEG-4 audio standard are generally used to transport metadata and not payload of media data (audio content). In an embodiment, the data stream element (DSE) in the MPEG-4 audio bitstream is used to transport the generated payload of additional media data. Therefore an existing Data stream element in MPEG-4 bitstream is used to transport payload of media data (e.g. earcons) instead and/or in addition to metadata. An example syntax is given below.

```
data_stream_element( ) {
    element_instance_tag;                              4 uimsbf
    data_byte_align_flag;                              1 uimsbf
    reserved;                                          3 uimsbf
    cnt = count;                                       8 uimsbf
    if (cnt == 255)
        cnt += esc_count;                              8 uimsbf
    if (data_byte_align_flag)
        byte_alignment( );
    for (i = 0; i < cnt; i++)
        data_stream_byte[element_instance_tag][i];     8 uimsbf
}
```

| Element | Description |
|---|---|
| element_instance_tag | A number to identify the data stream element. Must be handled with care if multiple DSEs are present |
| cnt | Size of the payload in bytes |
| data_stream_byte | Contains system_sound_info |

In an embodiment, the data stream element may be located at a predefined position in the modified bitstream and/or may include a specific instance tag.

Alternatively, in an embodiment, the MPEG-4 audio bitstream extension mechanism may be a Fill Element (ID_FIL). MPEG-4 audio defines another extension mechanism with the top level syntactic element extension_payload (int). For non-resilience payloads, extension_payload(int) may be contained inside a Fill Element (ID_FIL).

```
fill_element( ) {
    cnt = count;                          4    uimsbf
    if (cnt == 15)
        cnt += esc_count − 1;             8    uimsbf
    while (cnt > 0) {
        cnt −= extension_payload(cnt);
    }
}
```

In an embodiment, the generated payload may be transported via a generic extension payload element inside the Fill Element. Additionally, in an embodiment, further the generated information (information on the additional media data) and/or the generated information relating to the relative gain may be transported via the generic extension payload element inside the Fill Element. For example, for generic data, the extension_type EXT_DATA_ELEMENT may be used.

Alternatively, in an embodiment, the generated payload may be transported via a new extension payload element inside the Fill Element. Additionally, in an embodiment, further the generated information (information on the additional media data) and/or the generated information relating to the relative gain may be transported via the new extension payload element inside the Fill Element.

Fill elements in MPEG-4 audio standard are generally used to transport metadata and not payload of media data (audio content). In an embodiment, the data stream element (DSE) in the MPEG-4 audio bitstream is used to transport the generated payload of additional media data (e.g. as indicated above in a generic extension payload element or in a new extension payload element inside the Fill Element). Therefore an existing Fill Element in MPEG-4 bitstream is used to transport payload of media data (e.g. earcons) alternatively and/or additionally to metadata.

New extension payload types (extension_type) for the syntactic element system_sound_info( ) may be defined. The syntax of 14496-3, Table 4.59: "Syntax of extension_payload" may be extended as follows:

| Syntax | No. of bits | Mnemonic |
|---|---|---|
| extensionpayload(cnt) { | | |
|   extensiontype; | 4 | uimsbf |
|   align = 4; | | |
|   switch( extension_type ) { | | |
|     [...] | | |
|     case EXT_SYS_SOUND_INFO: | | |
|       return system_sound_info( ); | | |
|     [...] | | |
|   } | | |
| } | | |

Note 1:
id_aac is the id_syn_ele of the corresponding AAC element (ID_SCE or ID_CPE) or ID_SCE in case of CCE.
Note 2:
The extension_payload( ) included here shall not have extension_type == EXT_DATA_LENGTH.

In an embodiment, the new extension payload element may include a unique identifier. The unique identifier may be, for example, EXT_SYS_SOUND_INFO.

Using the above techniques, the additional media data and the information on the additional media data can be readily embedded into an existing MPEG-4 compliant bitstream that is passed-through by the source device.

Processing a Modified Bitstream on a Sink Device

Figure 3:
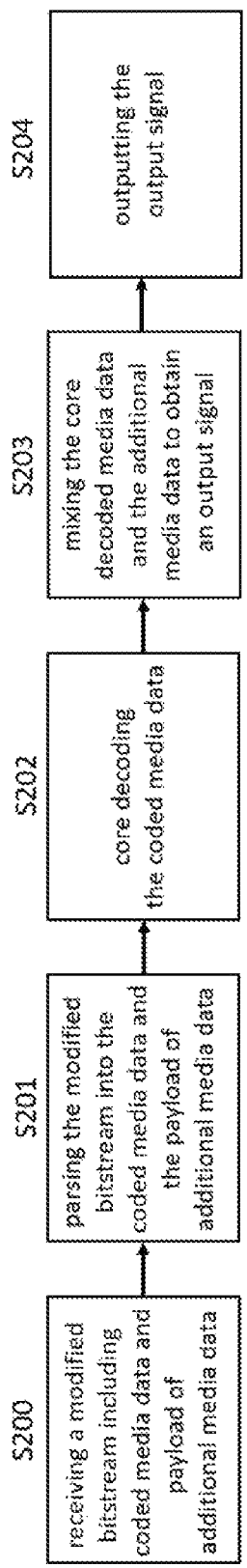
FIG. 3 illustrates a flow diagram of an example of a method for processing a modified bitstream on a sink device.

Referring now the example of FIG. 3, an example of a method for processing a modified bitstream on a sink device is illustrated. In step S200, a modified bitstream including coded media data (e.g. as received by the source device) and payload of additional media data may be received by a receiver of a sink device.

In step S201, the received modified bitstream may be parsed, by a bitstream parser, into the coded media data and the payload of additional media data. While the format of the modified bitstream is not limited, the modified bitstream may be in MPEG-4 audio format (i.e. MPEG-4 audio standard compliant bitstream). Referring to the example of FIG. 4, in an embodiment, the modified bitstream may include an MPEG-4 audio bitstream extension mechanism, and parsing in step S201 may further be based on identifying the MPEG-4 audio bitstream extension mechanism in the modified bitstream. In an embodiment, the MPEG-4 audio bitstream extension mechanism may be a data stream element (DSE) and parsing in step S201 may further be based on identifying a position of the data stream element in the modified bitstream and/or identifying a specific instance tag of the data stream element.

Alternatively, in an embodiment, the MPEG-4 audio bitstream extension mechanism may be a Fill Element (ID_FIL) and parsing in step S201 may further be based on identifying an extension payload element inside the Fill Element.

Figure 4:
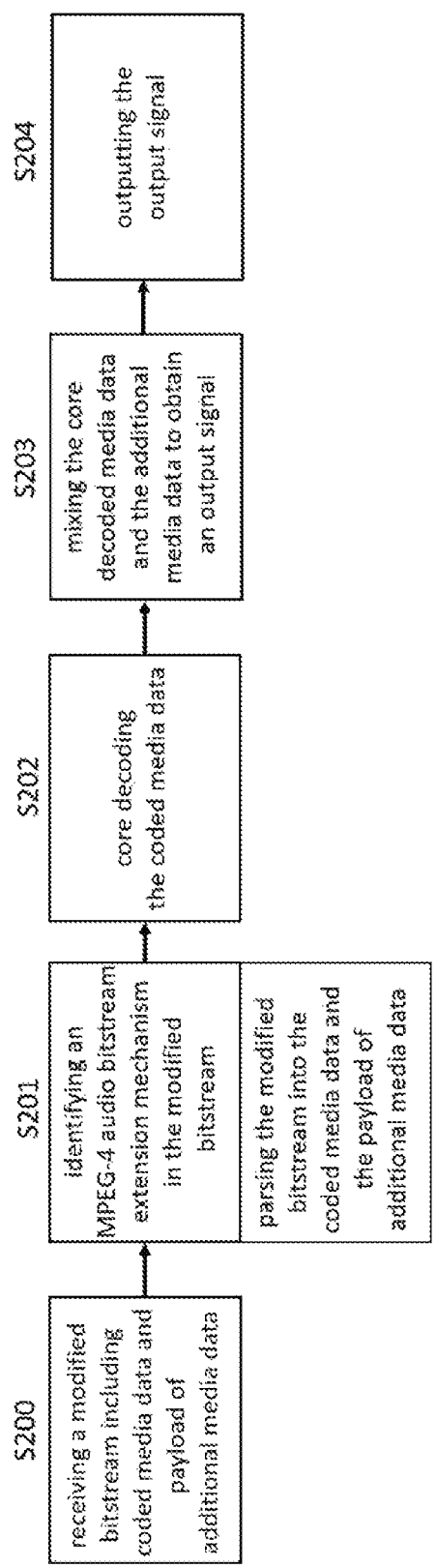
FIG. 4 illustrates a flow diagram of a further example of a method for processing a modified bitstream on a sink device.

Referring to the example of FIG. 3 or 4, in step S202, the coded media data may be core decoded by a core decoder.

In step S203, the core decoded media data may be mixed with the additional media data, by a mixer, to obtain an output signal.

In step 204, the obtained output signal may then be output by a control unit.

Figure 5:
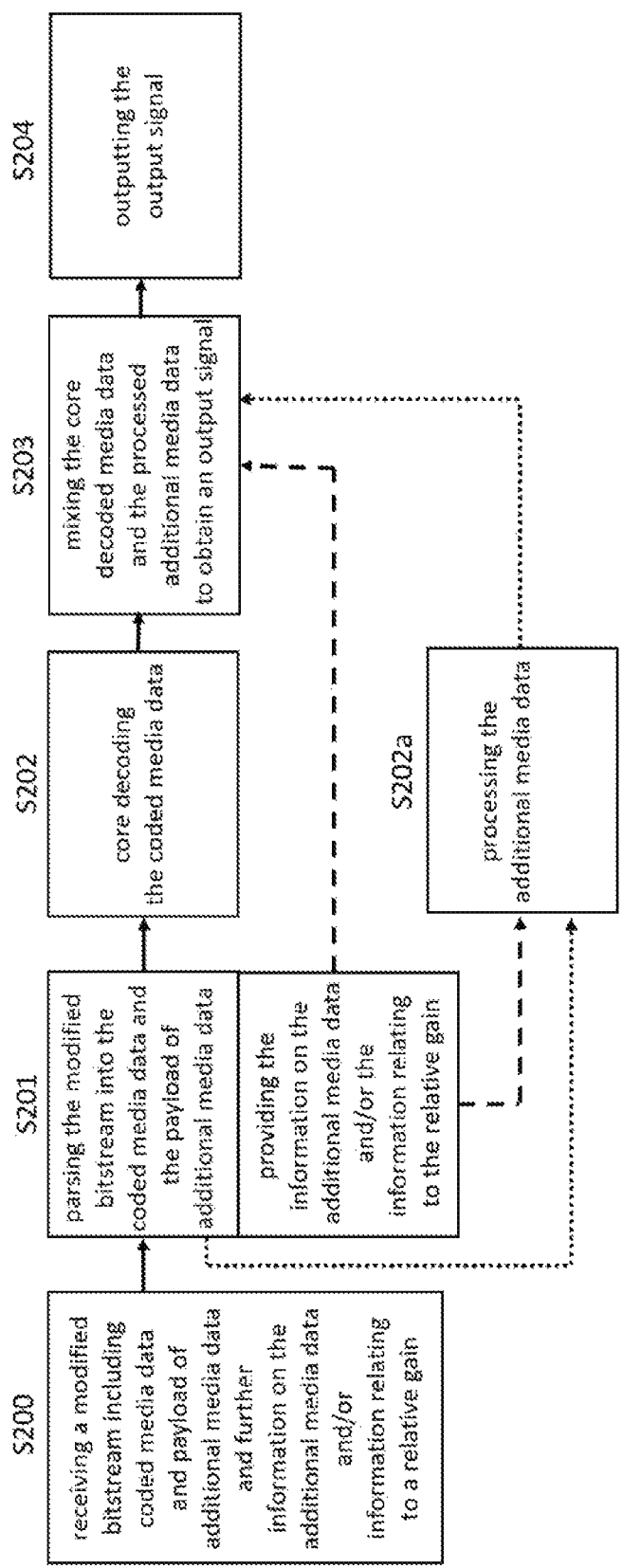
FIG. 5 illustrates a flow diagram of yet a further example of a method for processing a modified bitstream on a sink device.

Referring now to the example of FIG. 5, a further example of a method for processing a modified bitstream on a sink device is illustrated. In the example of FIG. 5, in an embodiment, the modified bitstream may further include information on the additional media data, and processing the modified bitstream by the sink device may be based on the information. In an embodiment, the information may include one or more of information on a configuration of the additional media data, information on a presence of the additional media data in the modified bitstream, information on a default loudness value, information on a value for delay alignment, information on delay adaption, information on panning and information on a type of the additional media data.

In the example of FIG. 5, the method may further include the step S202a of processing, by a processing unit, the additional media data prior to mixing the core decoded media data and the additional media data. In step S203, the core decoded media data are then mixed with the processed additional media data. In an embodiment, processing the additional media data may include one or more of resampling, delay adaption and loudness processing. The processing of the additional media data may be guided by (based on) the generated information included in the modified bitstream and provided in step S201 by the bitstream parser (as indicated by the dashed line). For example, resampling may be guided by information on a sampling rate of the additional media data which may be included in the information on the configuration of the additional media data. Alternatively, or additionally, processing the additional media data may include downmixing/upmixing the additional media data which may be guided by information on a channel mode which may be included in the information on the configuration of the additional media data. Loudness processing may be guided, for example, by information on a default loudness value which may include a measured loudness as according to one of the methods specified in ITU-R BS.1770-4.

Alternatively, or additionally, in an embodiment, the modified bitstream may further include information relating to a relative gain between the coded media data and the additional media data, and mixing in step S203 the core decoded media data and the additional media data, which may have optionally been processed prior to mixing to obtain processed additional media data (as indicated by the dotted lines), may be based on the information relating to the relative gain. In this, the sink device may use the relative gain value generated at the source device. In other words, both, source device and sink device may use the same relative gain value. The relative gain value may also further be modified via a user input in the mixing step S203. The relative gain value may include a mixing gain and/or an attenuation gain value.

The information relating to the relative gain may be provided in step S201 by the bitstream parser as indicated by the dashed line. The information on the additional media data and alternatively, or additionally, the information relating to the relative gain value may be embedded in the modified bitstream in the system_sound_config top level syntax element as described above.

In an embodiment, the additional media data may be compressed media data or uncompressed media data.

Figure 6:
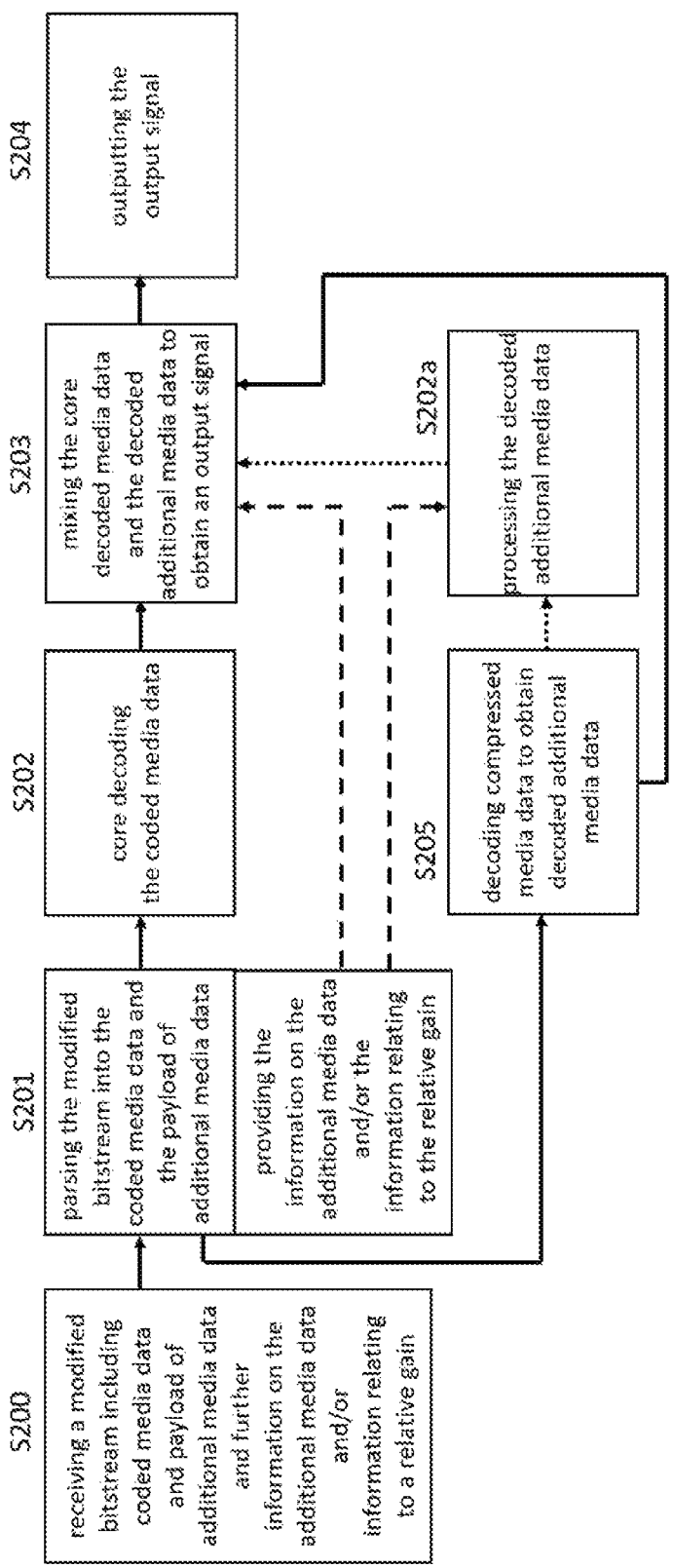
FIG. 6 illustrates a flow diagram of yet a further example of a method for processing a modified bitstream on a sink device.

Referring now to the example of FIG. 6, in an embodiment, the additional media data may be compressed media data and the method may further include the step S205 of decoding, by a decoder, the compressed media data to obtain decoded additional media data, and in step S203 the decoded additional media data may be mixed with the core decoded media data. If the method includes further a step of processing the additional media data, S202a, in case of compressed media data, the decoded additional media data may optionally be subjected to processing in step S202a, as detailed above and indicated by the dotted lines, prior to mixing with the core decoded media data. While the format of the compressed media data is not limited, the format may belong to the Bluetooth ecosystem. In an embodiment, the compressed media data may be in SBC format or in an aptX-based format. Also in case of compressed media data, processing in step S202a may be guided by (based on) generated information on the additional media data included in the modified bitstream and provided in step S201 as indicated by the dashed line.

Alternatively, or additionally, mixing in step S203 the core decoded media data and the decoded additional media data, which may have optionally been processed prior to mixing, may also be based on information relating to a relative gain as detailed above. The information relating to the relative gain may also be provided in step S201 as indicated by the dashed line.

Alternatively, in an embodiment, the additional media data may be uncompressed media data, and in step S203 the uncompressed additional media data may be mixed with the core decoded media data in accordance with the example illustrated in FIG. 3 or FIG. 4. In accordance with the example of FIG. 5, the uncompressed media data may also optionally be subjected to processing in step S202a, as detailed above, prior to mixing with the core decoded media data. In an embodiment, the uncompressed media data may be PCM data generated at the source device. In an embodiment, the PCM data may include one or more of earcon-data and system sounds data.

Source Device

Figure 7:
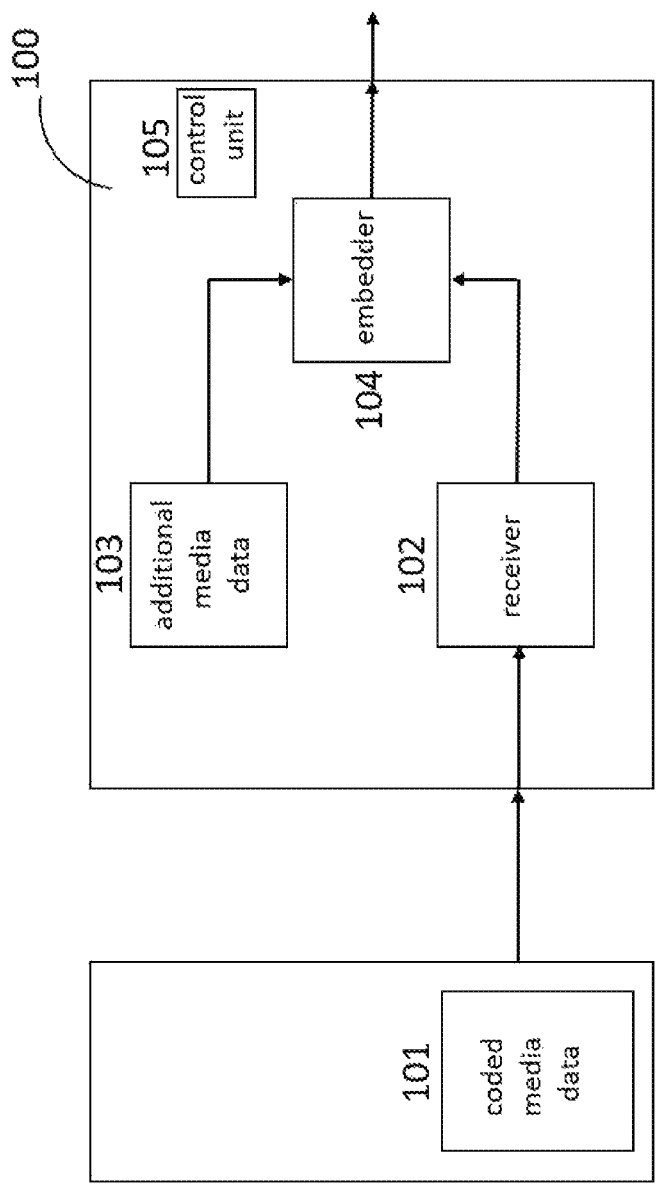
FIG. 7 illustrates an example of a source device for generating a modified bitstream.

Referring now to the example of FIG. 7, an example of a source device for generating a modified bitstream is illustrated. The source device 100 may include a receiver 102 configured to receive a bitstream including coded media data 101. The bitstream may be received, for example, from one or more media servers. The bitstream may, for example, deliver audio content to be played back by a sink device connected to the source device 100. The source device 100 is not limited. For example, the source device 100 may be a mobile device including one or more of a mobile phone, a smart watch, a laptop and a tablet pc including convertibles.

In an embodiment, the coded media data may be played back by the source device, the sink device or both the source device and the sink device. In an embodiment, the additional media data may be played back by the source device, the sink device or both the source device and the sink device.

The source device 100 may further include an embedder 104 configured to generate payload of additional media data 103 and to embed the generated payload in the bitstream to obtain a modified bitstream including the coded media data 101 and the payload of additional media data 103. In this, a modified bitstream may also be generated even if the source device is operated in pass-through mode. The source device 100 may be configured to pass through the coded media data to the sink device via the modified bitstream. The coded media data as received from the source device is embedded in the modified bitstream and outputted to the sink device.

Advantageously, generating (at the source device) and outputting the modified bitstream to the sink device streamlines mixing of the media data with the additional media data at the side of the sink device. A single bitstream is used by the source device to embed and transport the media data and the additional media data to the sink device, thereby a single channel/connection can be used between the source and the sink device. Furthermore, no additional decoders and/or encoders are present in the source device to, e.g., decode and re-encode the coded media data. No additional mixers are used in the source device to, e.g., mix decoded coded media data with the additional media data.

While the format of the modified bitstream is not limited, in an embodiment, the modified bitstream may be in MPEG-4 audio format (i.e. MPEG-4 audio standard compliant bitstream). In an embodiment, the embedder may be configured to transport the generated payload via an MPEG-4 audio bitstream extension mechanism in the modified bitstream as detailed above.

In an embodiment, the additional media data 103 may be compressed media data or uncompressed media data. While the uncompressed media data is not limited, in an embodiment, the uncompressed media data may be PCM data generated at the source device 100. While the generation of PCM data is not limited, in an embodiment, the generation of the PCM data may be based on a user input. The user input may be, for example, a key-press. The source device 100 may then include a user interface which may be, for example, a touch display. Alternatively, or additionally the source device 100 may further include at least a keyboard. However, the generation of the PCM data may also be facilitated at the source device 100 independent of a user input, e.g. based on an email notification. In an embodiment, the PCM data may include one or more of earcon-data and system sounds data. The PCM data may be stored in the source device 100.

While the compressed media data is not limited, the format of the compressed media data may belong to the Bluetooth ecosystem. In an embodiment, the compressed media data may be in SBC format or in an aptX-based format. The compressed media data may be generated at the source device 100. The compressed media data may be stored in the source device 100. Alternatively, or additionally, the compressed media data may be received via the receiver 102.

Figure 8:
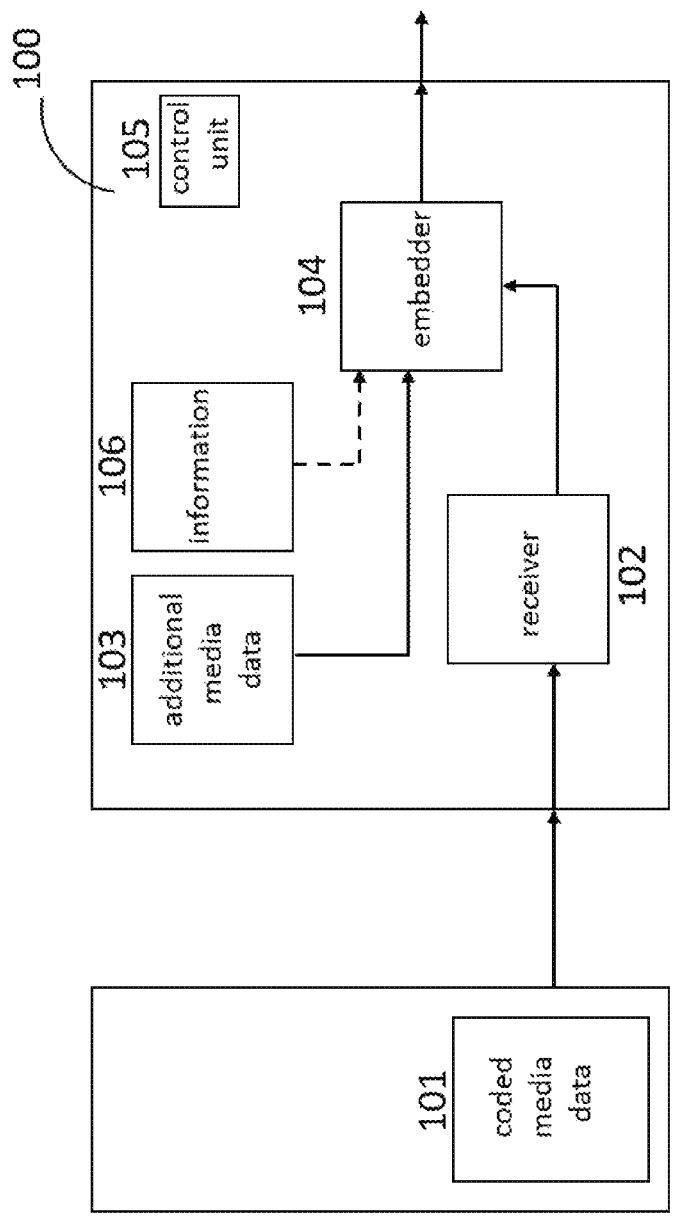
FIG. 8 illustrates a further example of a source device for generating a modified bitstream.

Referring now to the example of FIG. 8, in an embodiment, the embedder 104 may further be configured to generate information 106 on the additional media data 103 and to embed the generated information 106 in the bitstream (as indicated by the dashed line). Alternatively, or additionally, in an embodiment, the embedder 104 may further be configured to generate information 106 relating to a relative gain between the coded media data 101 and the additional media data 103 and to embed the information 106 relating to the relative gain in the bitstream (as also indicated by the dashed line). In an embodiment, the embedder may further be configured to transport the generated information and/or the generated information relating to the relative gain via the MPEG-4 audio bitstream extension mechanism in the modified bitstream as detailed above.

The source device 100 may further include a control unit 105 configured to output the modified bitstream to a sink device.

Sink Device

Figure 9:
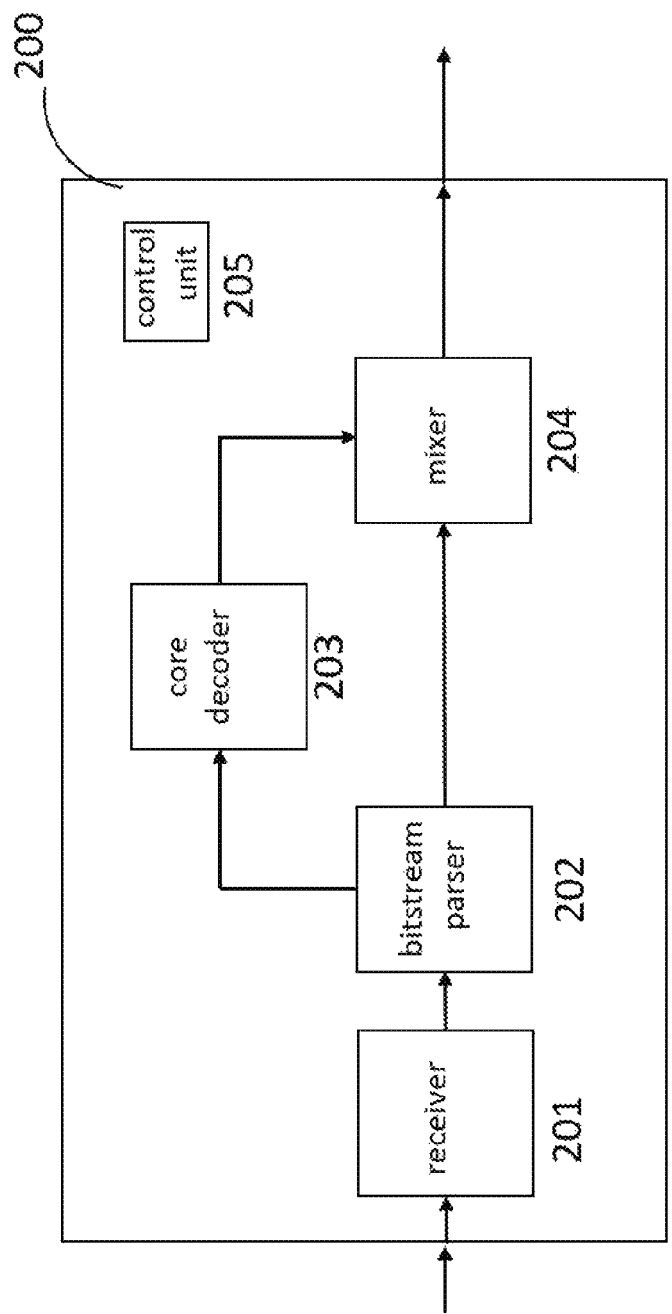
FIG. 9 illustrates an example of a sink device for processing a modified bitstream.

Referring now to the example of FIG. 9, an example of a sink device for processing a modified bitstream is illustrated. The sink device 200 may include a receiver 201 configured to receive a modified bitstream including coded media data and payload of additional media data. The sink device 200 is not limited. The sink device 200 may be a peripheral device to the source device, for example, earphones. The sink device 200 and the source device may be connected via Bluetooth. The sink device 200 may be configured to play back audio content included in the modified bitstream. For example, the sink device 200 may be configured to play back the coded media data or the additional media data or both the coded media data and the additional media data.

The sink device 200 may further include a bitstream parser 202 configured to parse the modified bitstream into the coded media data and the payload of the additional media data. While the format of the modified bitstream is not limited, the modified bitstream may be in MPEG-4 audio format (i.e. MPEG-4 audio standard compliant bitstream). As already detailed above, in an embodiment, the bitstream parser 202 may be configured to parse the bitstream based on identifying an MPEG-4 audio bitstream extension mechanism in the modified bitstream.

The sink device 200 may further include a core decoder 203 configured to core decode the coded media data to obtain core decoded media data. In an embodiment, the core decoder 203 may be an MPEG-4 audio decoder (compliant with the MPEG-4 audio standard as detailed above).

The sink device 200 may further include a mixer 204 configured to mix the core decoded media data and the additional media data to obtain an output signal. In an embodiment, the additional media data may be compressed media data or uncompressed media data. In an embodiment, the additional media data may be uncompressed media data, and the mixer 204 may be configured to mix the core decoded media data and the uncompressed additional media data.

Figure 10:
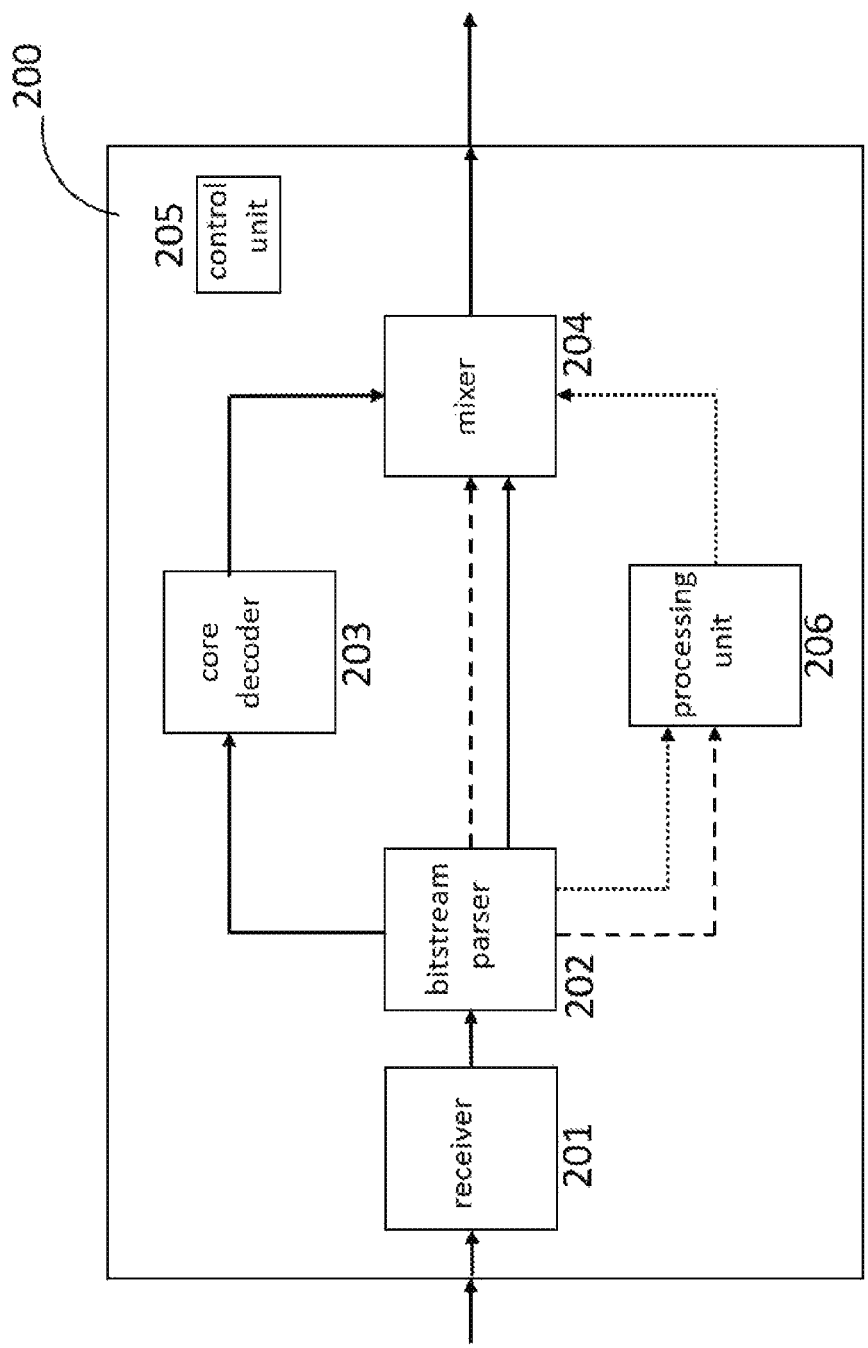
FIG. 10 illustrates a further example of a sink device for processing a modified bitstream.

Referring now to the example of FIG. 10, the modified bitstream may further include information on the additional media data, and the sink device 200 may be configured to process the modified bitstream based on the information. In an embodiment, the sink device 200 may further include a processing unit 206 configured to process the additional media data prior to mixing the core decoded media data and the additional media data in the mixer 204. In an embodiment, processing the additional media data by the processing unit 206 may include one or more of resampling, delay adaption and loudness processing. Processing the additional media data by the processing unit 206 may be guided by (based on) the information on the additional media data as detailed above. The information on the additional media data may be provided by the bitstream parser 202 to the processing unit 206 as indicated by the dashed line. In case of the additional media data being uncompressed media data, the uncompressed media data may be directly processed after the modified bitstream has been parsed in the bitstream parser 202 and prior to entering the mixer 204.

Alternatively, or additionally, in an embodiment, the modified bitstream may further include information relating to a relative gain between the coded media data and the additional media data, and the mixer 204 may further be configured to mix the core decoded media data and the additional media data, which may optionally have been processed prior to mixing (as indicated by the dotted lines), based on the information relating to the relative gain as described above. The information relating to the relative gain may be provided to the mixer 204 by the bitstream parser 202 as indicated by the dashed line.

Figure 11:
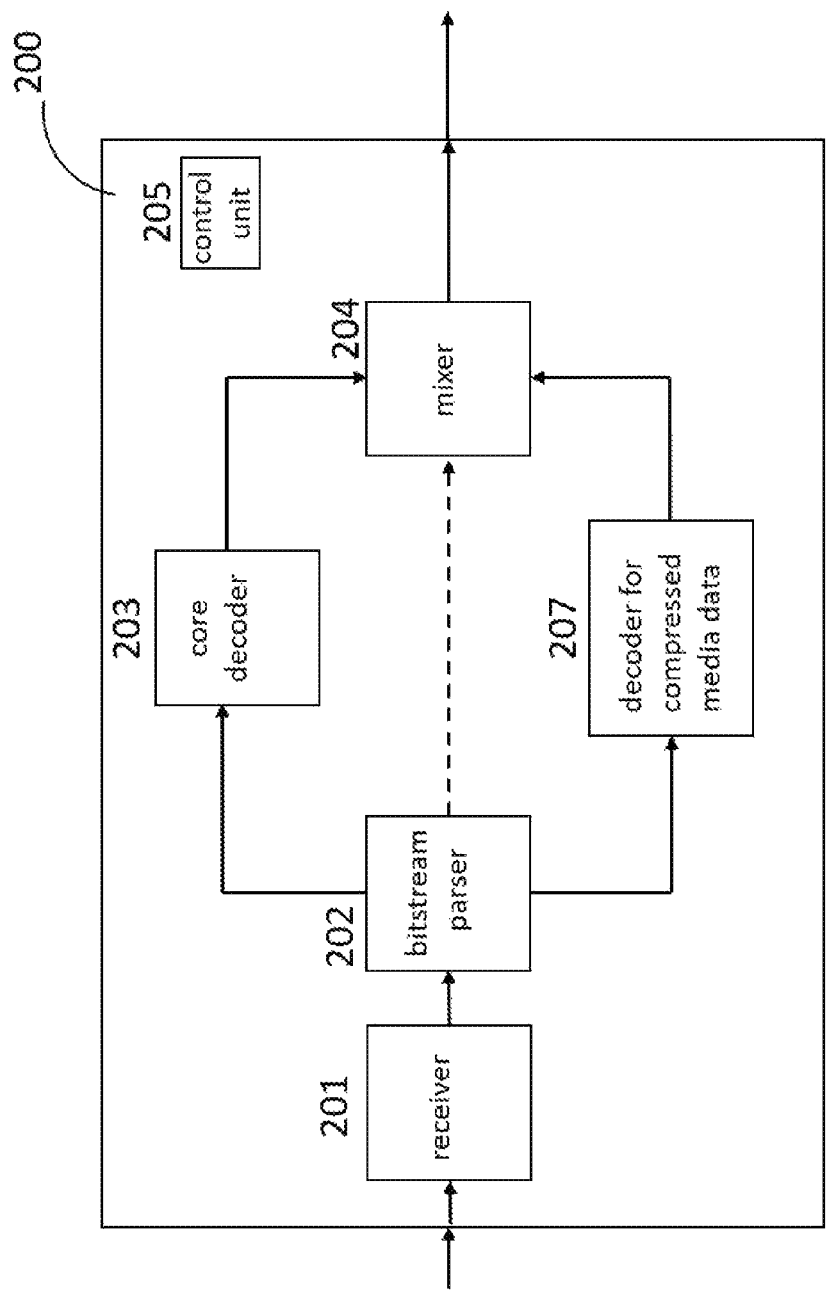
FIG. 11 illustrates yet a further example of a sink device for processing a modified bitstream.

In an embodiment, the additional media data may be compressed media data. Referring now to the example of FIG. 11, the sink device 200 may further include a decoder 207 configured to decode the compressed media data to obtain decoded additional media data, and the mixer 204 may be configured to mix the core decoded media data and the decoded additional media data. Alternatively or additionally, the modified bitstream may further include information relating to a relative gain between the coded media data and the additional media data, and the mixer 204 may further be configured to mix the core decoded media data and the decoded additional media data based on the information relating to the relative gain as described above. The information relating to the relative gain may be provided to the mixer 204 by the bitstream parser 202 as indicated by the dashed line.

Figure 12:
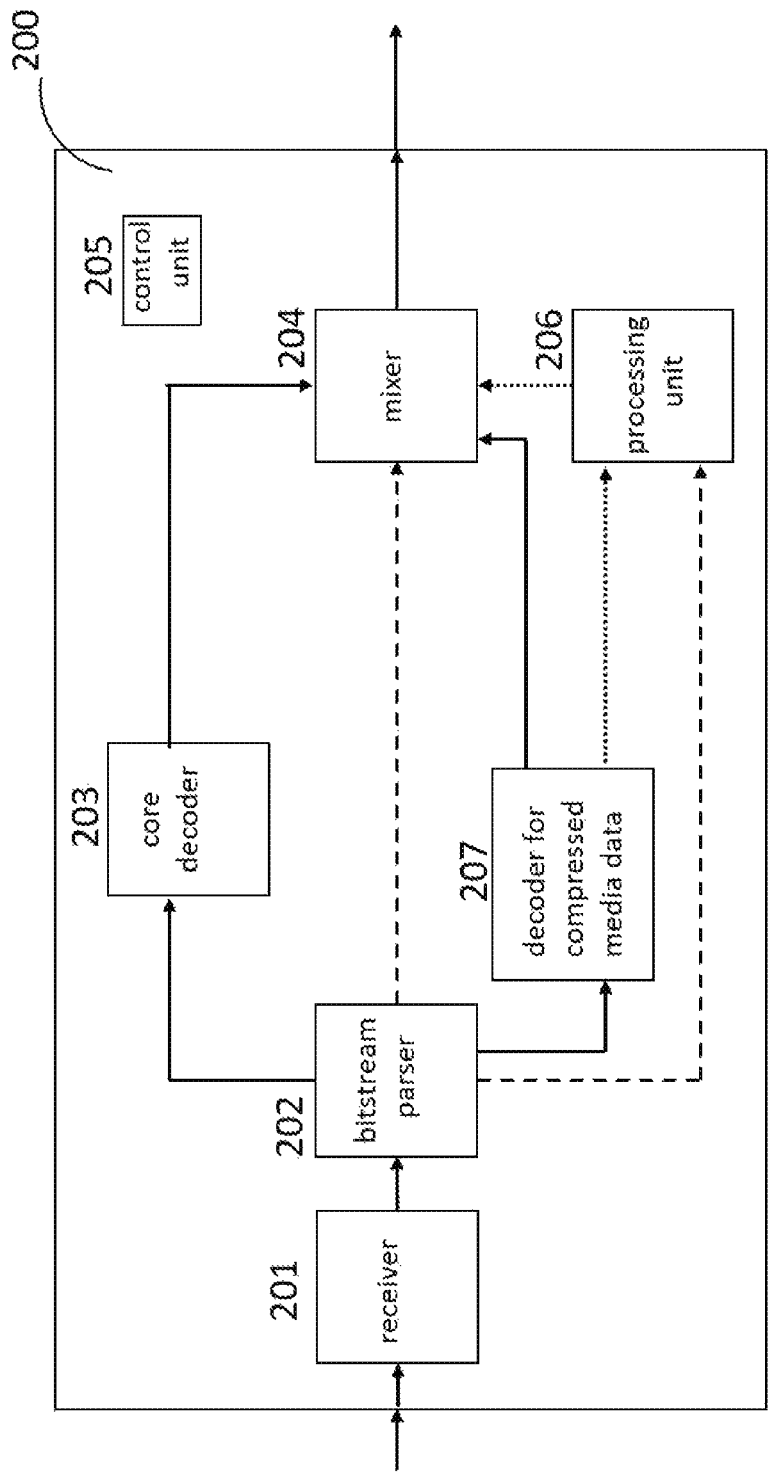
FIG. 12 illustrates yet a further example of a sink device for processing a modified bitstream.

Referring further to the example of FIG. 12, the decoded additional media data may further optionally be processed by the processing unit 206 prior to mixing with the core decoded media data in the mixer 204 (as indicated by the dotted lines). Processing the decoded additional media data by the processing unit 206 may be guided by (based on) information on the additional media data which may be included in the modified bitstream as detailed above. The information on the additional media data may be provided by the bitstream parser 202 to the processing unit 206 as indicated by the dashed line.

Referring to the examples of FIGS. 9 to 12, the sink device 200 may further include a control unit 205 configured to output the output signal. For example, the output signal may be output via earphones to a user of the sink device 200.

Figure 13:
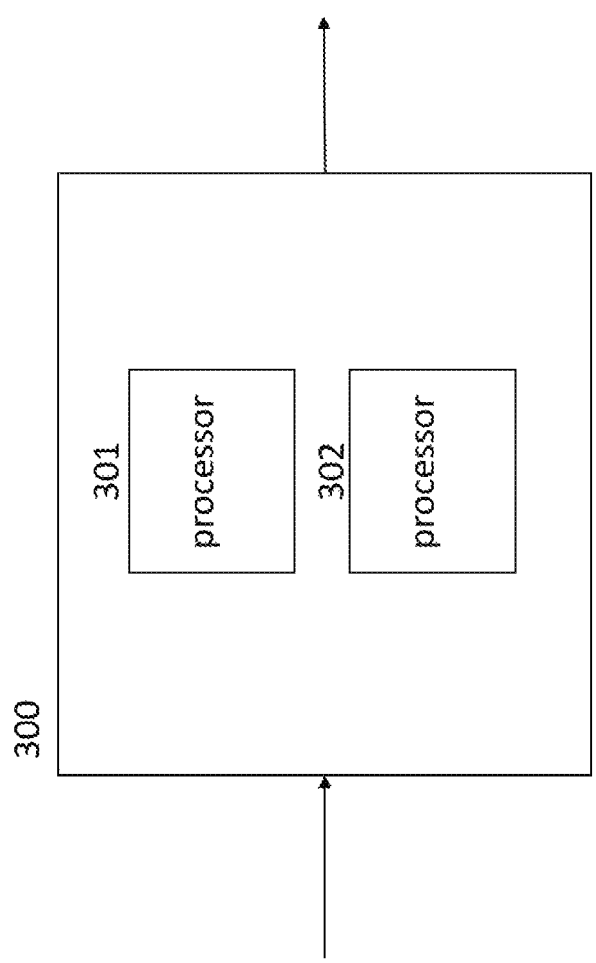
FIG. 13 illustrates an example of a device having one or more processors.

The above described methods may be implemented individually on the above described devices. The above described devices capable of performing the above described methods may also form a respective system. Devices 300, as referred to herein, may include one or more processors 301, 302 as illustrated by way of example in FIG. 13. Alternatively, or additionally, the above described methods may also be implemented as a computer program product comprising a computer-readable storage medium with instructions adapted to cause the device 300 to carry out said methods when executed on a device 300 having processing capability 301, 302.

Interpretation

Unless specifically stated otherwise, as apparent from the following discussions, it is appreciated that throughout the disclosure discussions utilizing terms such as "processing," "computing," "calculating," "determining", analyzing" or the like, refer to the action and/or processes of a computer or computing system, or similar electronic computing devices, that manipulate and/or transform data represented as physical, such as electronic, quantities into other data similarly represented as physical quantities.

In a similar manner, the term "processor" may refer to any device or portion of a device that processes electronic data, e.g., from registers and/or memory to transform that electronic data into other electronic data that, e.g., may be stored in registers and/or memory. A "computer" or a "computing machine" or a "computing platform" may include one or more processors.

The methodologies described herein are, in one example embodiment, performable by one or more processors that accept computer-readable (also called machine-readable) code containing a set of instructions that when executed by one or more of the processors carry out at least one of the methods described herein. Any processor capable of executing a set of instructions (sequential or otherwise) that specify actions to be taken are included. Thus, one example is a typical processing system that includes one or more processors. Each processor may include one or more of a CPU, a graphics processing unit, and a programmable DSP unit. The processing system further may include a memory subsystem including main RAM and/or a static RAM, and/or ROM. A bus subsystem may be included for communicating between the components. The processing system further may be a distributed processing system with processors coupled by a network. If the processing system requires a display, such a display may be included, e.g., a liquid crystal display (LCD) or a cathode ray tube (CRT) display. If manual data entry is required, the processing system also includes an input device such as one or more of an alphanumeric input unit such as a keyboard, a pointing control device such as a mouse, and so forth. The processing system may also encompass a storage system such as a disk drive unit. The processing system in some configurations may include a sound output device, and a network interface device. The memory subsystem thus includes a computer-readable carrier medium that carries computer-readable code (e.g., software) including a set of instructions to cause performing, when executed by one or more processors, one or more of the methods described herein. Note that when the method includes several elements, e.g., several steps, no ordering of such elements is implied, unless specifically stated. The software may reside in the hard disk, or may also reside, completely or at least partially, within the RAM and/or within the processor during execution thereof by the computer system. Thus, the memory and the processor also constitute computer-readable carrier medium carrying computer-readable code. Furthermore, a computer-readable carrier medium may form, or be included in a computer program product.

In alternative example embodiments, the one or more processors operate as a standalone device or may be connected, e.g., networked to other processor(s), in a networked deployment, the one or more processors may operate in the capacity of a server or a user machine in server-user network environment, or as a peer machine in a peer-to-peer or distributed network environment. The one or more processors may form a personal computer (PC), a tablet PC, a Personal Digital Assistant (PDA), a cellular telephone, a web appliance, a network router, switch or bridge, or any machine capable of executing a set of instructions (sequential or otherwise) that specify actions to be taken by that machine.

Note that the term "machine" shall also be taken to include any collection of machines that individually or jointly execute a set (or multiple sets) of instructions to perform any one or more of the methodologies discussed herein.

Thus, one example embodiment of each of the methods described herein is in the form of a computer-readable carrier medium carrying a set of instructions, e.g., a computer program that is for execution on one or more processors, e.g., one or more processors that are part of web server arrangement. Thus, as will be appreciated by those skilled in the art, example embodiments of the present disclosure may be embodied as a method, an apparatus such as a special purpose apparatus, an apparatus such as a data processing system, or a computer-readable carrier medium, e.g., a computer program product. The computer-readable carrier medium carries computer readable code including a set of instructions that when executed on one or more processors cause the processor or processors to implement a method. Accordingly, aspects of the present disclosure may take the form of a method, an entirely hardware example embodiment, an entirely software example embodiment or an example embodiment combining software and hardware aspects. Furthermore, the present disclosure may take the form of carrier medium (e.g., a computer program product on a computer-readable storage medium) carrying computer-readable program code embodied in the medium.

The software may further be transmitted or received over a network via a network interface device. While the carrier medium is in an example embodiment a single medium, the term "carrier medium" should be taken to include a single medium or multiple media (e.g., a centralized or distributed database, and/or associated caches and servers) that store the one or more sets of instructions. The term "carrier medium" shall also be taken to include any medium that is capable of storing, encoding or carrying a set of instructions for execution by one or more of the processors and that cause the one or more processors to perform any one or more of the methodologies of the present disclosure. A carrier medium may take many forms, including but not limited to, non-volatile media, volatile media, and transmission media. Non-volatile media includes, for example, optical, magnetic disks, and magneto-optical disks. Volatile media includes dynamic memory, such as main memory. Transmission media includes coaxial cables, copper wire and fiber optics, including the wires that comprise a bus subsystem. Transmission media may also take the form of acoustic or light waves, such as those generated during radio wave and infrared data communications. For example, the term "carrier medium" shall accordingly be taken to include, but not be limited to, solid-state memories, a computer product embodied in optical and magnetic media; a medium bearing a propagated signal detectable by at least one processor or one or more processors and representing a set of instructions that, when executed, implement a method; and a transmission medium in a network bearing a propagated signal detectable by at least one processor of the one or more processors and representing the set of instructions.

It will be understood that the steps of methods discussed are performed in one example embodiment by an appropriate processor (or processors) of a processing (e.g., computer) system executing instructions (computer-readable code) stored in storage. It will also be understood that the disclosure is not limited to any particular implementation or programming technique and that the disclosure may be implemented using any appropriate techniques for implementing the functionality described herein. The disclosure is not limited to any particular programming language or operating system.

Reference throughout this disclosure to "one example embodiment", "some example embodiments" or "an example embodiment" means that a particular feature, structure or characteristic described in connection with the example embodiment is included in at least one example embodiment of the present disclosure. Thus, appearances of the phrases "in one example embodiment", "in some example embodiments" or "in an example embodiment" in various places throughout this disclosure are not necessarily all referring to the same example embodiment. Furthermore, the particular features, structures or characteristics may be combined in any suitable manner, as would be apparent to one of ordinary skill in the art from this disclosure, in one or more example embodiments.

As used herein, unless otherwise specified the use of the ordinal adjectives "first", "second", "third", etc., to describe a common object, merely indicate that different instances of like objects are being referred to and are not intended to imply that the objects so described must be in a given sequence, either temporally, spatially, in ranking, or in any other manner.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

It should be appreciated that in the above description of example embodiments of the disclosure, various features of the disclosure are sometimes grouped together in a single example embodiment, Fig., or description thereof for the purpose of streamlining the disclosure and aiding in the understanding of one or more of the various inventive aspects. This method of disclosure, however, is not to be interpreted as reflecting an intention that the claims require more features than are expressly recited in each claim. Rather, as the following claims reflect, inventive aspects lie in less than all features of a single foregoing disclosed example embodiment. Thus, the claims following the Description are hereby expressly incorporated into this Description, with each claim standing on its own as a separate example embodiment of this disclosure.

Furthermore, while some example embodiments described herein include some but not other features included in other example embodiments, combinations of features of different example embodiments are meant to be within the scope of the disclosure, and form different example embodiments, as would be understood by those skilled in the art. For example, in the following claims, any of the claimed example embodiments can be used in any combination.

In the description provided herein, numerous specific details are set forth. However, it is understood that example embodiments of the disclosure may be practiced without these specific details. In other instances, well-known methods, structures and techniques have not been shown in detail in order not to obscure an understanding of this description.

Thus, while there has been described what are believed to be the best modes of the disclosure, those skilled in the art will recognize that other and further modifications may be made thereto without departing from the spirit of the disclosure, and it is intended to claim all such changes and modifications as fall within the scope of the disclosure. For example, any formulas given above are merely representative of procedures that may be used. Functionality may be added or deleted from the block diagrams and operations may be interchanged among functional blocks. Steps may be added or deleted to methods described within the scope of the present disclosure.

Enumerated example embodiments (EEEs) of the present disclosure are listed below.

A-EEE 1. A method for generating a modified bitstream on a source device, wherein the method includes the steps of:
 a) receiving, by a receiver, a bitstream including coded media data;
 b) generating, by an embedder, payload of additional media data and embedding the payload in the bitstream for obtaining, as an output from the embedder, a modified bitstream including the coded media data and the payload of the additional media data; and
 c) outputting the modified bitstream to a sink device.

A-EEE 2. Method according to A-EEE 1, wherein step b) further includes generating information on the additional media data and embedding the information in the bitstream.

A-EEE 3. Method according to A-EEE 2, wherein the generated information includes one or more of information on a configuration of the additional media data, information on a presence of the additional media data in the modified bitstream, information on a default loudness value, information on a value for delay alignment, information on delay adaption, information on panning and information on a type of the additional media data.

A-EEE 4. Method according to any of A-EEEs 1 to 3, wherein step b) further includes generating information relating to a relative gain between the coded media data and the additional media data and embedding the information relating to the relative gain in the bitstream.

A-EEE 5. Method according to any of A-EEEs 1 to 4, wherein the modified bitstream is in MPEG-4 audio format.

A-EEE 6. Method according to A-EEE 5, wherein the generated payload is embedded in the bitstream by transporting the payload in the modified bitstream via an MPEG-4 audio bitstream extension mechanism.

A-EEE 7. Method according to A-EEE 6, wherein further the generated information and/or the generated information relating to the relative gain are embedded in the bitstream by transporting the generated information and/or the generated information relating to the relative gain in the modified bitstream via the MPEG-4 audio bitstream extension mechanism.

A-EEE 8. Method according to A-EEE 6 or 7, wherein the MPEG-4 audio bitstream extension mechanism is a data stream element (DSE).

A-EEE 9. Method according to A-EEE 8, wherein the data stream element is located at a predefined position in the modified bitstream and/or includes a specific instance tag.

10. Method according to A-EEE 6 or 7, wherein the MPEG-4 audio bitstream extension mechanism is a Fill Element (ID_FIL).

A-EEE 11. Method according to A-EEE 10, wherein the generated payload is transported via a generic extension payload element inside the Fill Element.

A-EEE 12. Method according to A-EEE 11, wherein further the generated information and/or the generated information relating to the relative gain are transported via the generic extension payload element inside the Fill Element.

A-EEE 13. Method according to A-EEE 10, wherein the generated payload is transported via a new extension payload element inside the Fill Element.

A-EEE 14. Method according to A-EEE 13, wherein further the generated information and/or the generated information relating to the relative gain are transported via the new extension payload element inside the Fill Element.

A-EEE 15. Method according to A-EEE 13 or 14, wherein the new extension payload element includes a unique identifier.

A-EEE 16. Method according to any of A-EEEs 1 to 15, wherein in step c) the modified bitstream is output to the sink device via a Bluetooth connection.

A-EEE 17. Method according to any of A-EEEs 1 to 16, wherein the additional media data are compressed media data or uncompressed media data.

A-EEE 18. Method according to A-EEE 17, wherein the uncompressed media data are PCM data generated at the source device.

A-EEE 19. Method according to A-EEE 18, wherein the generation of the PCM data is based on a user input.

A-EEE 20. Method according to A-EEE 18 or 19, wherein the PCM data include one or more of earcon-data and system sounds data.

A-EEE 21. Method according to A-EEE 17, wherein the compressed data are in SBC format or in an aptX-based format.

A-EEE 22. A method for processing a modified bitstream on a sink device, wherein the method includes the steps of:

a) receiving, by a receiver, a modified bitstream including coded media data and payload of additional media data;
b) parsing, by a bitstream parser, the modified bitstream into the coded media data and the payload of additional media data;
c) core decoding, by a core decoder, the coded media data to obtain core decoded media data;
d) mixing, by a mixer, the core decoded media data and the additional media data to obtain an output signal; and
e) outputting the output signal.

A-EEE 23. Method according to A-EEE 22, wherein the modified bitstream further includes information on the additional media data, and wherein the method further includes, after step a) and before step b), a step of processing the modified bitstream based on the information.

A-EEE 24. Method according to A-EEE 23, wherein the information includes one or more of information on a configuration of the additional media data, information on a presence of the additional media data in the modified bitstream, information on a default loudness value, information on a value for delay alignment, information on delay adaption, information on panning and information on a type of the additional media data.

A-EEE 25. Method according to any of A-EEEs 22 to 24, wherein the modified bitstream further includes information relating to a relative gain between the coded media data and the additional media data, and wherein mixing in step d) the core decoded media data and the additional media data is based on the information relating to the relative gain.

A-EEE 26. Method according to any of A-EEEs 22 to 25, wherein the method further includes the step of processing, by a processing unit, the additional media data prior to mixing the core decoded media data and the additional media data.

A-EEE 27. Method according to A-EEE 26, wherein processing the additional media data includes one or more of resampling, delay adaption and loudness processing.

A-EEE 28. Method according to any of A-EEEs 22 to 27, wherein the additional media data are compressed media data and the method further includes the step of decoding, by a decoder, the compressed media data to obtain decoded additional media data, and wherein in step d) the decoded additional media data are mixed with the core decoded media data.

A-EEE 29. Method according to A-EEE 28, wherein the compressed media data are in SBC format or in an aptX-based format.

A-EEE 30. Method according to any of A-EEEs 22 to 27, wherein the additional media data are uncompressed media data, and wherein in step d) the uncompressed additional media data are mixed with the core decoded media data.

A-EEE 31. Method according to any of A-EEEs 22 to 30, wherein the modified bitstream is in MPEG-4 audio format.

A-EEE 32. Method according to A-EEE 31, wherein the modified bitstream includes an MPEG-4 audio bitstream extension mechanism, and wherein parsing in step b) is further based on identifying the MPEG-4 audio bitstream extension mechanism in the modified bitstream.

A-EEE 33. Method according to A-EEE 32, wherein the MPEG-4 audio bitstream extension mechanism is a data stream element (DSE) and parsing in step b) is further based on identifying a position of the data stream element in the modified bitstream and/or identifying a specific instance tag of the data stream element.

A-EEE 34. Method according to A-EEE 32, wherein the MPEG-4 audio bitstream extension mechanism is a Fill Element (ID_FIL) and parsing in step b) is further based on identifying an extension payload element inside the Fill Element.

A-EEE 35. Source device for generating a modified bitstream, wherein the device includes:
- a) a receiver configured to receive a bitstream including coded media data;
- b) an embedder configured to generate payload of additional media data and to embed the generated payload in the bitstream to obtain a modified bitstream including the coded media data and the payload of the additional media data; and
- c) a control unit configured to output the modified bitstream to a sink device.

A-EEE 36. Device according to A-EEE 35, wherein the embedder is further configured to generate information on the additional media data and to embed the information in the bitstream.

A-EEE 37. Device according to A-EEE 35 or 36, wherein the embedder is further configured to generate information relating to a relative gain between the coded media data and the additional media data and to embed the information relating to the relative gain in the bitstream.

A-EEE 38. Device according to any of A-EEEs 35 to 37, wherein the modified bitstream is in MPEG-4 audio format.

A-EEE 39. Device according to any of A-EEEs 35 to 38, wherein the additional media data are compressed media data or uncompressed media data.

A-EEE 40. Device according to A-EEE 39, wherein the uncompressed media data are PCM data generated at the source device.

A-EEE 41. Device according to A-EEE 40, wherein the generation of the PCM data is based on a user input.

A-EEE 42. Device according to A-EEE 40 or 41, wherein the PCM data include one or more of earcon-data and system sounds data.

A-EEE 43. Device according to A-EEE 39, wherein the compressed media data are in SBC format or in an aptX-based format.

A-EEE 44. Sink device for processing a modified bitstream, wherein the device includes:
- a) a receiver configured to receive a modified bitstream including coded media data and payload of additional media data;
- b) a bitstream parser configured to parse the modified bitstream into the coded media data and the payload of the additional media data;
- c) a core decoder configured to core decode the coded media data to obtain core decoded media data;
- d) a mixer configured to mix the core decoded media data and the additional media data to obtain an output signal; and
- e) a control unit configured to output the output signal.

A-EEE 45. Device according to A-EEE 44, wherein the device further includes a processing unit configured to process the additional media data prior to mixing the core decoded media data and the additional media data.

A-EEE 46. Device according to A-EEE 44 or 45, wherein the additional media data are uncompressed media data, and wherein the mixer is configured to mix the core decoded media data and the uncompressed additional media data.

A-EEE 47. Device according to A-EEE 44 or 45, wherein the additional media data are compressed media data and the device further includes a decoder to decode the compressed media data to obtain decoded additional media data, and wherein the mixer is configured to mix the core decoded media data and the decoded additional media data.

A-EEE 48. Device according to any of A-EEEs 44 to 47, wherein the modified bitstream further includes information on the additional media data, and wherein the sink device is configured to process the modified bitstream based on the information.

A-EEE 49. Device according to any of A-EEEs 44 to 48, wherein the modified bitstream further includes information relating to a relative gain between the coded media data and the additional media data, and wherein the mixer is further configured to mix the core decoded media data and the additional media data based on the information relating to the relative gain.

A-EEE 50. Device according to any of A-EEEs 44 to 49, wherein the core decoder is an MPEG-4 audio decoder.

A-EEE 51. System of a source device for generating a modified bitstream, wherein the source device includes one or more processors configured to perform the method according to any of A-EEEs 1 to 21 and a sink device for processing a modified bitstream, wherein the sink device includes one or more processors configured to perform the method according to A-EEEs 22 to 34.

A-EEE 52. A computer program product comprising a computer-readable storage medium with instructions adapted to cause the device to carry out the method according to A-EEE 1 when executed by a device having processing capability.

A-EEE 53. A computer program product comprising a computer-readable storage medium with instructions adapted to cause the device to carry out the method according to A-EEE 22 when executed by a device having processing capability.

B-EEE 1. A method for generating a modified bitstream on a source device, wherein the method includes the steps of:
- a) receiving, by a receiver, a bitstream including coded media data;
- b) generating, by an embedder, payload of additional media data and embedding the payload in the bitstream for obtaining, as an output from the embedder, a modified bitstream including the coded media data and the payload of the additional media data; and
- c) outputting the modified bitstream to a sink device.

B-EEE 2. Method according to B-EEE 1,
wherein step b) further includes generating information on the additional media data and embedding the information in the bitstream; and optionally
wherein the generated information includes one or more of information on a configuration of the additional media data, information on a presence of the additional media data in the modified bitstream, information on a default loudness value, information on a value for delay alignment, information on delay adaption, information on panning and information on a type of the additional media data.

B-EEE 3. Method according to B-EEE 1, wherein step b) further includes generating information relating to a relative gain between the coded media data and the additional media data and embedding the information relating to the relative gain in the bitstream.

B-EEE 4. Method according to B-EEE 1,
wherein the modified bitstream is in MPEG-4 audio format; and
wherein the generated payload is embedded in the bitstream by transporting the payload in the bitstream via an MPEG-4 audio bitstream extension mechanism.

B-EEE 5. Method according to B-EEE 3,
wherein the modified bitstream is in MPEG-4 audio format; and
wherein the generated information and/or the generated information relating to the relative gain are embedded in the bitstream by transporting the generated information and/or the generated information relating to the relative gain in the bitstream via an MPEG-4 audio bitstream extension mechanism.

B-EEE 6. Method according to B-EEE 4,
wherein the MPEG-4 audio bitstream extension mechanism is a data stream element (DSE); or
wherein the MPEG-4 audio bitstream extension mechanism is a Fill Element (ID_FIL), and wherein optionally the generated payload is transported via a generic extension payload element or a new extension payload element inside the Fill Element.

B-EEE 7. Method according to B-EEE 1, wherein in step c) the modified bitstream is output to the sink device via a Bluetooth connection.

B-EEE 8. Method according to B-EEE 1, wherein the additional media data are PCM data generated at the source device.

B-EEE 9. Method according to B-EEE 8, wherein the PCM data include one or more of earcon-data and system sounds data.

B-EEE 10. Method according to B-EEE 1, wherein the additional media data are compressed data in SBC format or in an aptX-based format.

B-EEE 11. A method for processing a modified bitstream on a sink device, wherein the method includes the steps of:
 a) receiving, by a receiver, a modified bitstream including coded media data and payload of additional media data;
 b) parsing, by a bitstream parser, the modified bitstream into the coded media data and the payload of additional media data;
 c) core decoding, by a core decoder, the coded media data to obtain core decoded media data;
 d) mixing, by a mixer, the core decoded media data and the additional media data to obtain an output signal; and
 e) outputting the output signal.

B-EEE 12. Method according to B-EEE 11, wherein the modified bitstream further includes information relating to a relative gain between the coded media data and the additional media data, and wherein mixing in step d) the core decoded media data and the additional media data is based on the information relating to the relative gain.

B-EEE 13. Method according to B-EEE 11,
wherein the method further includes the step of processing, by a processing unit, the additional media data prior to mixing the core decoded media data and the additional media data; and optionally
wherein processing the additional media data includes one or more of resampling, delay adaption and loudness processing.

B-EEE 14. Method according to B-EEE 11,
wherein the modified bitstream is in MPEG-4 audio format; and
wherein the modified bitstream includes an MPEG-4 audio bitstream extension mechanism, and wherein parsing in step b) is further based on identifying the MPEG-4 audio bitstream extension mechanism in the modified bitstream.

B-EEE 15. Method according to B-EEE 14,
wherein the MPEG-4 audio bitstream extension mechanism is a data stream element (DSE) and parsing in step b) is further based on identifying a position of the data stream element in the modified bitstream and/or identifying a specific instance tag of the data stream element; or
wherein the MPEG-4 audio bitstream extension mechanism is a Fill Element (ID_FIL) and parsing in step b) is further based on identifying an extension payload element inside the Fill Element.

B-EEE 16. Source device for generating a modified bitstream, wherein the device includes:
 a) a receiver configured to receive a bitstream including coded media data;
 b) an embedder configured to generate payload of additional media data and to embed the generated payload in the bitstream to obtain a modified bitstream including the coded media data and the payload of the additional media data; and
 c) a control unit configured to output the modified bitstream to a sink device.

B-EEE 17. Sink device for processing a modified bitstream, wherein the device includes:
 a) a receiver configured to receive a modified bitstream including coded media data and payload of additional media data;
 b) a bitstream parser configured to parse the modified bitstream into the coded media data and the payload of the additional media data;
 c) a core decoder configured to core decode the coded media data to obtain core decoded media data;
 d) a mixer configured to mix the core decoded media data and the additional media data to obtain an output signal; and
 e) a control unit configured to output the output signal.

B-EEE 18. System of a source device for generating a modified bitstream, wherein the source device includes one or more processors configured to perform the method according to B-EEE 1 and a sink device for processing a modified bitstream, wherein the sink device includes one or more processors configured to perform the method according to B-EEE 11.

B-EEE 19. A computer program product comprising a computer-readable storage medium with instructions adapted to cause the device to carry out the method according to B-EEE 1 when executed by a device having processing capability.

B-EEE 20. A computer program product comprising a computer-readable storage medium with instructions adapted to cause the device to carry out the method according to B-EEE 11 when executed by a device having processing capability.

The invention claimed is:

1. A method for generating a modified bitstream in MPEG-4 audio format by a source device, the source device comprising a receiver and an embedder, wherein the method includes the steps of:
 a) receiving, by the receiver, a bitstream including coded media data;
 b) generating, by the embedder, payload of additional uncompressed PCM audio data and embedding the payload in the bitstream for obtaining, as an output from the embedder, a modified bitstream including the coded media data and the payload of the additional uncompressed PCM audio data, wherein the generated payload is embedded in the bitstream by transporting the payload in the modified bitstream via an MPEG-4 audio bitstream extension mechanism, wherein the MPEG-4 audio bitstream extension mechanism is a data stream element (DSE); and
c) outputting the modified bitstream to the sink device.

2. Method according to claim 1, wherein step b) further includes generating information on the additional uncompressed PCM audio data and embedding the information in the bitstream.

3. Method according to claim 2, wherein the generated information includes one or more of information on a configuration of the additional uncompressed PCM audio data, information on a presence of the additional uncompressed PCM audio data in the modified bitstream, information on a default loudness value, information on a value for delay alignment, information on delay adaption, information on panning and information on a type of the additional data uncompressed PCM audio data.

4. Method according to claim 1, wherein step b) further includes generating information relating to a relative gain between the coded media data and the additional uncompressed PCM audio data and embedding the information relating to the relative gain in the bitstream.

5. Method according to claim 2, wherein further the generated information and/or the generated information relating to the relative gain are embedded in the bitstream by transporting the generated information and/or the generated information relating to the relative gain in the modified bitstream via the MPEG-4 audio bitstream extension mechanism.

6. Method according to claim 1, wherein the MPEG-4 audio bitstream extension mechanism is a data stream element (DSE) and the data stream element (DSE) is located at a predefined position in the modified bitstream and/or includes a specific instance tag.

7. Method according to claim 1, wherein in step c) the modified bitstream is output to the sink device via a Bluetooth connection.

8. Method according to claim 1, wherein the generation of the PCM audio data is based on a user input.

9. Method according to claim 1, wherein the PCM audio data include one or more of earcon-data and system sounds data.

10. A method for processing a modified bitstream in MPEG-4 audio format by a sink device comprising a receiver, a bitstream parser, a core decoder, a mixer, wherein the method includes the steps of:
a) receiving, by the receiver, a modified bitstream including coded media data, payload of additional uncompressed PCM audio data and an MPEG-4 audio bitstream extension mechanism, wherein the MPEG-4 audio bitstream extension mechanism is a data stream element (DSE);
b) parsing, by the bitstream parser, the modified bitstream into the coded media data and the payload of additional uncompressed PCM audio data, wherein the parsing is based on identifying the MPEG-4 audio bitstream extension mechanism in the modified bitstream;
c) core decoding, by the core decoder, the coded media data to obtain core decoded media data;
d) mixing, by the mixer, the core decoded media data and the additional uncompressed PCM audio data to obtain an output signal; and
e) outputting the output signal.

11. Method according to claim 10, wherein the modified bitstream further includes information on the additional uncompressed PCM audio data, and wherein the method further includes, after step a) and before step b), a step of processing the modified bitstream based on the information.

12. Method according to claim 11, wherein the information includes one or more of information on a configuration of the additional uncompressed PCM audio data, information on a presence of the additional uncompressed PCM audio data in the modified bitstream, information on a default loudness value, information on a value for delay alignment, information on delay adaption, information on panning and information on a type of the additional uncompressed PCM audio data.

13. Method according to claim 10, wherein the modified bitstream further includes information relating to a relative gain between the coded media data and the additional uncompressed PCM audio data, and wherein mixing in step d) the core decoded media data and the additional uncompressed PCM audio data is based on the information relating to the relative gain.

14. Method according to claim 13, wherein processing the additional uncompressed PCM audio data includes one or more of resampling, delay adaption and loudness processing.

15. Method according to claim 10, wherein parsing in step b) is further based on identifying a position of the data stream element in the modified bitstream and/or identifying a specific instance tag of the data stream element.

16. Source device for generating a modified bitstream in MPEG-4 audio format, wherein the device includes:
a) a receiver configured to receive a bitstream including coded media data;
b) an embedder configured to generate payload of additional uncompressed PCM audio data and to embed the generated payload in the bitstream to obtain a modified bitstream including the coded media data and the payload of the additional uncompressed PCM audio data wherein the embedder is further configured to embed the generated payload in the bitstream by transporting the payload in the modified bitstream via an MPEG-4 audio bitstream extension mechanism, wherein the MPEG-4 audio bitstream extension mechanism is a data stream element (DSE); and
c) a control unit configured to output the modified bitstream to a sink device.

17. Sink device for processing a modified bitstream in MPEG-4 audio format, wherein the device includes:
a) a receiver configured to receive a modified bitstream including coded media data, payload of additional uncompressed PCM audio data and an MPEG-4 audio bitstream extension mechanism, wherein the MPEG-4 audio bitstream extension mechanism is a data stream element (DSE);
b) a bitstream parser configured to parse the modified bitstream into the coded media data and the payload of the additional uncompressed PCM audio data, wherein the bitstream parser is further configured to parse the modified bitstream based on identifying the MPEG-4 audio bitstream extension mechanism in the modified bitstream;
c) a core decoder configured to core decode the coded media data to obtain core decoded media data;
d) a mixer configured to mix the core decoded media data and the additional uncompressed PCM audio data to obtain an output signal; and
e) a control unit configured to output the output signal.

18. Device according to claim 17, wherein the device further includes a processing unit configured to process the additional uncompressed PCM audio data prior to mixing the core decoded media data and the additional uncompressed PCM audio data.

19. Device according to claim 17, wherein the modified bitstream further includes information on the additional uncompressed PCM audio data, and wherein the sink device is configured to process the modified bitstream based on the information.

20. Device according to claim 19, wherein the modified bitstream further includes information relating to a relative gain between the coded media data and the additional uncompressed PCM audio data, and wherein the mixer is further configured to mix the core decoded media data and the additional uncompressed PCM audio data based on the information relating to the relative gain.

21. Device according to claim 19, wherein the core decoder is an MPEG-4 audio decoder.

\* \* \* \* \*